(12) United States Patent
Whitehorn

(10) Patent No.: US 10,356,234 B2
(45) Date of Patent: Jul. 16, 2019

(54) ENHANCED CALLING SYSTEMS AND METHODS

(71) Applicant: UNITI, LLC, Gilbert, AZ (US)

(72) Inventor: Benjamin J. Whitehorn, Gilbert, AZ (US)

(73) Assignee: UNITI, LLC, Gilbert, AZ (US)

(*) Notice: Subject to any disclaimer, the term of this patent is extended or adjusted under 35 U.S.C. 154(b) by 0 days.

(21) Appl. No.: 15/692,687

(22) Filed: Aug. 31, 2017

(65) Prior Publication Data

US 2019/0068773 A1 Feb. 28, 2019

(51) Int. Cl.
*G06F 3/0482* (2013.01)
*H04M 1/725* (2006.01)
*H04M 7/00* (2006.01)
*G06F 16/907* (2019.01)

(52) U.S. Cl.
CPC ...... *H04M 1/72522* (2013.01); *G06F 3/0482* (2013.01); *G06F 16/907* (2019.01); *H04M 1/72583* (2013.01); *H04M 7/0024* (2013.01)

(58) Field of Classification Search
CPC ........... H04W 4/12; H04W 4/16; H04W 4/18; H04W 4/005; H04W 4/008; H04W 76/02; H04W 16/16; H04W 48/18; H04W 76/027; H04M 1/22522; H04M 1/0024; H04M 1/72583; G06F 3/0482; G06F 16/907
See application file for complete search history.

(56) References Cited

U.S. PATENT DOCUMENTS

| 9,325,624 | B2* | 4/2016 | Malatack | H04L 47/125 |
| 9,743,234 | B2* | 8/2017 | Varoglu | H04W 4/021 |
| 2010/0048191 | A1* | 2/2010 | Bender | H04M 3/42382 455/416 |
| 2010/0124196 | A1* | 5/2010 | Bonar | H04B 7/0689 370/329 |

(Continued)

OTHER PUBLICATIONS

International Search Report issued in PCT/US2018/047769 dated Sep. 21, 2018.
Written Opinion issued in PCT/US2018/047769 dated Sep. 21, 2018.

*Primary Examiner* — Jean A Gelin
(74) *Attorney, Agent, or Firm* — DLA Piper LLP (US)

(57) ABSTRACT

Systems and methods described herein may present one or more enhanced communication features during a call. A destination identifier for a communication sent by a first device may be detected, the destination identifier being an identifier associated with a second device. A source identifier for the communication sent by the first device may be detected, the source identifier being an identifier associated with the first device. A first connection between the first device and a server device may be established, the server device comprising a database of call-enhancing elements. A second connection between the second device and the server device may be established. A direct connection between the first device and the second device may be established. By at least one of the first connection, the second connection, and the direct connection, at least one call-enhancing element may be shared with the first device and the second device, the at least one call-enhancing element being associated with at least one of the source identifier and the destination identifier.

30 Claims, 18 Drawing Sheets

(56) References Cited

U.S. PATENT DOCUMENTS

| | | | | |
|---|---|---|---|---|
| 2011/0044438 A1* | 2/2011 | Wang | ............... | H04L 65/4015 |
| | | | | 379/93.02 |
| 2011/0045816 A1* | 2/2011 | Wang | ............... | G06F 3/038 |
| | | | | 455/420 |
| 2013/0325949 A1* | 12/2013 | Virani | ............... | G06F 9/541 |
| | | | | 709/204 |
| 2014/0226657 A1* | 8/2014 | Bouvet | ............... | H04L 65/1016 |
| | | | | 370/352 |
| 2015/0338219 A1* | 11/2015 | Wang | ............... | G01C 21/26 |
| | | | | 701/537 |
| 2016/0072861 A1* | 3/2016 | Woolsey | ............... | H04L 51/046 |
| | | | | 455/414.1 |

* cited by examiner

ENHANCED CALLING SYSTEMS AND METHODS

DETAILED DESCRIPTION OF SEVERAL EMBODIMENTS

Figure 1:
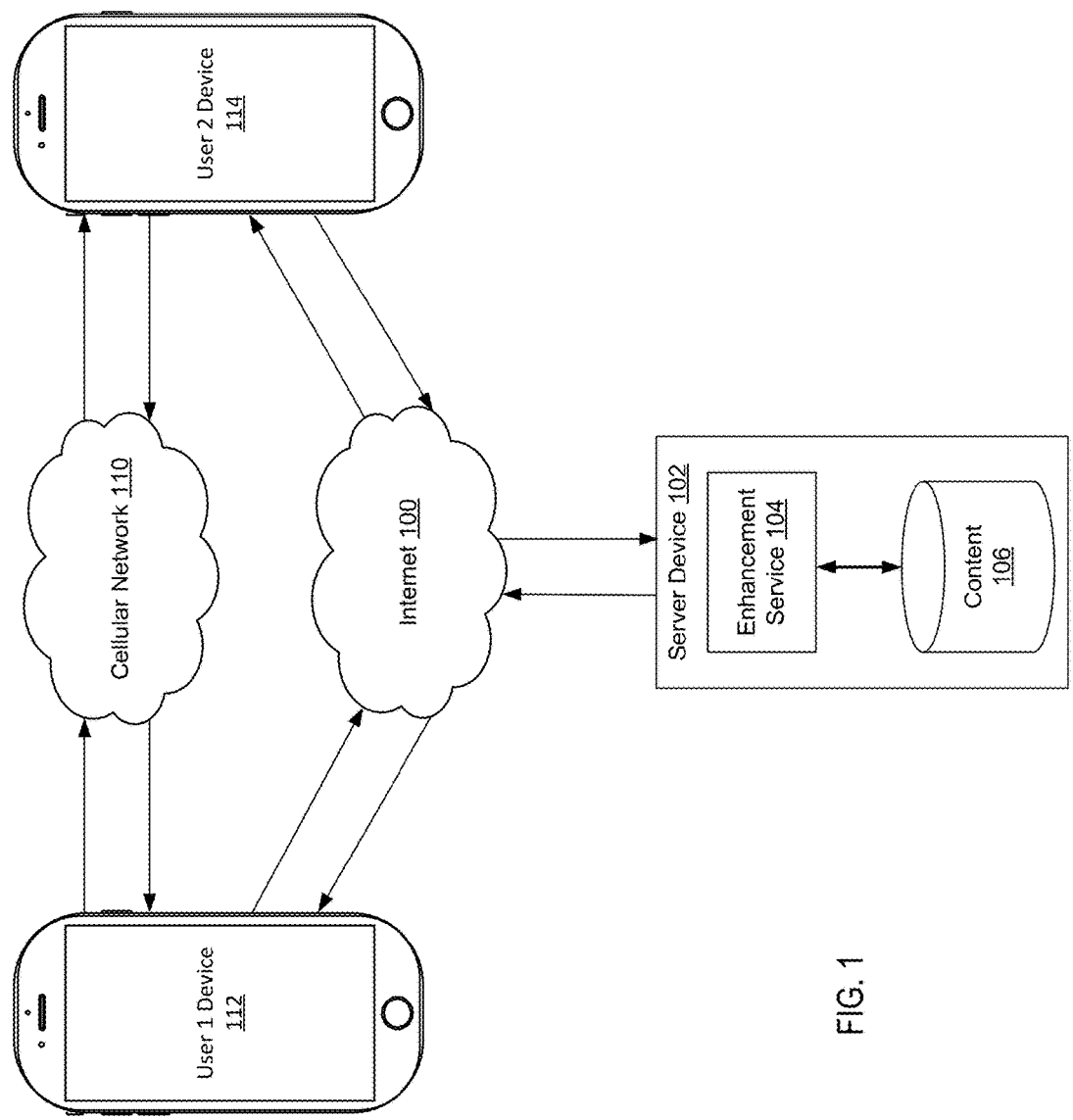
FIG. 1 shows a plurality of devices and networks according to an embodiment of the invention.

Computing devices, such as smartphones, tablets, and/or personal computers, may be configured to facilitate audio and/or video communication between users. For example, many computing devices are configured to send and receive calls on one or more cellular networks. When users call each other, they may be presented with limited content and tools while in call. For example, content that is provided to the person receiving the call may be chosen by the person receiving the call. Customization tools may be made available based on what the phone manufacturer or device operating system developer selects.

Systems and methods described herein may allow users to enhance voice calls by providing content, tools, and features within the phone call user interface (UI) that may increase the efficiency of voice calls and allow users to have more fulfilling voice communications.

For example, systems and methods described herein may allow users to select call-enhancing elements such as pictures (e.g., static or animated), video, audio, layouts, and/or other content (e.g., user-generated or privately or publicly available) for display on the user's screen and/or the screen of other people the user may call or who may call the user. Selected content may appear when the users call other people. For example, user 1 can control what user 2 sees on their phone during a call. In some embodiments, content may be targetable so that when user 1 calls user 2, the content can be different from when user 1 calls user 3.

In some embodiments, content may be augmented by other call-enhancing elements such as tools that enable contextual communication, such as mini-apps pre-loaded with information payloads from the user to facilitate fast transmittal and communication and/or allow information gathered from other available sources to be available for presentation during the call. The other information may include social media information, search engine information, and/or information from other websites or applications, either public or private. The pre-loaded and/or gathered information may be used to enhance the in-call experience of the individual or individuals on the call.

Systems and methods described herein may allow users to share screens and/or enable synchronized video viewing, audio listening, and/or article/web/book reading, for example. Additional tools may be shown to the respective users based on what they have used during calls previously and/or based on what they say while on a call. For example, tools may include automated caller verification using voice print analysis and/or other biometric methods within the device. Tools may include location awareness to enable call enhancement (for example, if calling from in front of a movie theater, a tool may automatically pop movie show times into the phone call, or restaurant reservation options if near a restaurant, etc.). Tools may include payment facilitation in-call. Tools may use observed behavior on a device to surface relevant applications based on information and content (e.g., the last time two users were on a call, they opened a specific spreadsheet, so a tool may make that spreadsheet available the next time the users are on a call together). Tools may use natural language processing or other artificial intelligence (which may be local to the device or hosted) for automatically surfacing relevant applications, tools, information, and content during a call or voice conversation (e.g., the tool may listen to the conversation and pick up key words to associate to the relevant tools, apps, content, etc., and surface relevant options based on those voice inputs).

System Architecture

FIG. 1 shows a plurality of devices and networks according to an embodiment of the invention. User devices, for example including user 1 device 112 and user 2 device 114, may be devices such as smartphones or other computing devices. User devices 112, 114 may include hardware, software, and/or firmware configured to provide the enhanced calling features described herein. For example, user 1 device 112, user 2 device 114, or both may include an app or other hardware/software/firmware configured to detect a placed or received call, contact a server to obtain enhanced data, and present the enhanced data, as described in greater detail below.

User devices 112, 114 are depicted as smartphones in FIG. 1 for ease of illustration, but user devices 112, 114 may be any combination of computing devices. For example, one or more of user devices 112, 114 may include wearable devices such as smartwatches, smart televisions, digital media players, desktop computers, laptop computers, servers, tablets, augmented reality (AR) devices, virtual reality (VR) devices, and/or other computing devices.

User devices 112, 114 may be configured to communicate using calling network 110 (e.g., a cellular network or other call network such as a network configured to handle voice over IP (VOIP) traffic or other types of calls) and/or the Internet 100 (or other data network). As described in greater detail below, user devices 112, 114 may communicate with one another using calling network 110. For example, user 1 device 112 may initiate a call to user 2 device 114 or vice versa, and the call may be handled by calling network 110.

Server device 102 may be a computing device, such as a server or other computer. Server device 102 may include enhancement service 104 configured to receive data from user devices 112, 114 and, based on this data, determine what content or other call-enhancing elements to provide. Server device 102 may include content database 106 configured to store content and/or other call-enhancing elements. Stored content may include, for example, still and/or animated pictures, video, text, audio, social media content (e.g., feeds, etc.), and/or applications (e.g., payment apps, game apps, customer relationship management (CRM) apps, collaboration apps, screen sharing apps, etc.).

Server device 102 is depicted as a single server including a single enhancement service 104 and content database 106 in FIG. 1 for ease of illustration, but those of ordinary skill in the art will appreciate that server device 102 may be embodied in different forms for different implementations. For example, server device 102 may include a plurality of servers (e.g., an authentication server configured to handle security and authentication protocols for account and content access, a database server configured to store profile information, layouts, content, other call-enhancing elements, and information associated with each account in one or more content databases 106, and/or a web server configured to provide web access to the database server). Enhancement service 104 may comprise a variety of services such as an application programming interface (API) configured for handling inbound requests for authentication and information and/or a database service configured to store, search, and retrieve data from content database 106.

User devices 112, 114 may communicate with one another and/or with server device 102 using the Internet 100. For example, user devices 112, 114 may receive content and/or other call-enhancing elements for use in cellular calls from server device 102 as described in greater detail below.

Figure 2:
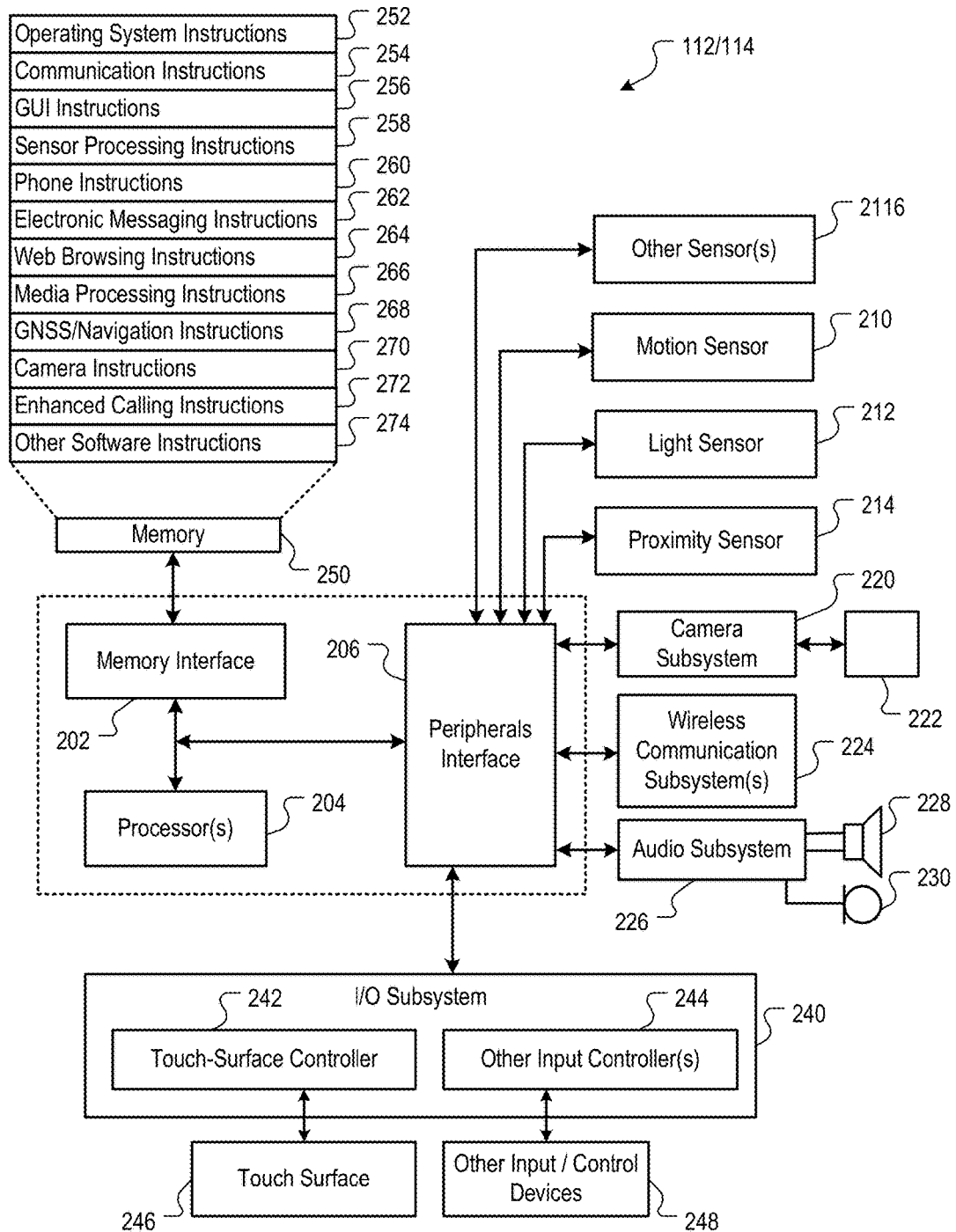
FIG. 2 shows a computing device according to an embodiment of the invention.

FIG. 2 is a block diagram of an example computing device, for example a computing device configured to function as user device 112 or 114. For example, computing device 112/114 may send and/or receive calls and access enhanced data during the calls as described herein. The computing device 112/114 may include a memory interface 202, one or more data processors, image processors, and/or central processing units 204, and a peripherals interface 206. The memory interface 202, the one or more processors 204, and/or the peripherals interface 206 may be separate components or may be integrated in one or more integrated circuits. The various components in the computing device 112/114 may be coupled by one or more communication buses or signal lines.

Sensors, devices, and subsystems may be coupled to the peripherals interface 206 to facilitate multiple functionalities. For example, a motion sensor 210, a light sensor 212, and a proximity sensor 214 may be coupled to the peripherals interface 206 to facilitate orientation, lighting, and proximity functions. Other sensors 216 may also be connected to the peripherals interface 206, such as a global navigation satellite system (GNSS) (e.g., GPS receiver), a temperature sensor, a biometric sensor, magnetometer, or other sensing device, to facilitate related functionalities.

A camera subsystem 220 and an optical sensor 222, e.g., a charged coupled device (CCD) or a complementary metal-oxide semiconductor (CMOS) optical sensor, may be utilized to facilitate camera functions, such as recording photographs and video clips. The camera subsystem 220 and the optical sensor 222 may be used to collect images of a user to be used during authentication of a user, e.g., by performing facial recognition analysis.

Communication functions may be facilitated through one or more wired and/or wireless communication subsystems 224, which can include radio frequency receivers and transmitters and/or optical (e.g., infrared) receivers and transmitters. For example, the BTLE and/or WiFi communications described above may be handled by wireless communication subsystems 224. The specific design and implementation of the communication subsystems 224 may depend on the communication network(s) over which the computing device 112/114 is intended to operate. For example, the computing device 112/114 may include communication subsystems 224 designed to operate over a GSM network, a GPRS network, an EDGE network, a WiFi or WiMax network, and a Bluetooth™ network. For example, the wireless communication subsystems 224 may include hosting protocols such that the device 112/114 can be configured as a base station for other wireless devices and/or to provide a WiFi service.

An audio subsystem 226 may be coupled to a speaker 228 and a microphone 530 to facilitate voice-enabled functions, such as speaker recognition, voice replication, digital recording, and telephony functions. The audio subsystem 226 may be configured to facilitate processing voice commands, voiceprinting, and voice authentication, for example.

The I/O subsystem 240 may include a touch-surface controller 242 and/or other input controller(s) 244. The touch-surface controller 242 may be coupled to a touch surface 246. The touch surface 246 and touch-surface controller 242 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 246.

The other input controller(s) 244 may be coupled to other input/control devices 248, such as one or more buttons, rocker switches, thumb-wheel, infrared port, USB port, and/or a pointer device such as a stylus. The one or more buttons (not shown) may include an up/down button for volume control of the speaker 228 and/or the microphone 230.

In some implementations, a pressing of the button for a first duration may disengage a lock of the touch surface 246; and a pressing of the button for a second duration that is longer than the first duration may turn power to the computing device 112/114 on or off. Pressing the button for a third duration may activate a voice control, or voice command, module that enables the user to speak commands into the microphone 230 to cause the device to execute the spoken command. The user may customize a functionality of one or more of the buttons.

The touch surface 246 can, for example, also be used to implement virtual or soft buttons and/or a keyboard.

In some implementations, the computing device 112/114 may present recorded audio and/or video files, such as MP3, AAC, and MPEG files. In some implementations, the computing device 112/114 may include the functionality of an MP3 player, such as an iPod™. The computing device 112/114 may, therefore, include a 36-pin connector and/or 8-pin connector that is compatible with the iPod. Other input/output and control devices may also be used.

The memory interface 202 may be coupled to memory 250. The memory 250 may include high-speed random access memory and/or non-volatile memory, such as one or more magnetic disk storage devices, one or more optical storage devices, and/or flash memory (e.g., NAND, NOR). The memory 250 may store an operating system 252, such as Darwin, RTXC, LINUX, UNIX, OS X, WINDOWS, or an embedded operating system such as VxWorks.

The operating system 252 may include instructions for handling basic system services and for performing hardware dependent tasks. In some implementations, the operating system 252 may be a kernel (e.g., UNIX kernel). In some implementations, the operating system 252 may include instructions for performing voice authentication.

The memory 250 may also store communication instructions 254 to facilitate communicating with one or more additional devices, one or more computers and/or one or more servers. The memory 250 may include graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GNSS/Navigation instructions 268 to facilitate GNSS and navigation-related processes and instructions; and/or camera instructions 270 to facilitate camera-related processes and functions.

The memory 250 may store enhanced calling instructions 272 to facilitate other processes and functions, such as the enhanced calling features described herein (e.g., communication with server device 102 and presentation of enhanced content).

The memory 250 may also store other software instructions 274, such as web video instructions to facilitate web video-related processes and functions; and/or web shopping instructions to facilitate web shopping-related processes and functions. In some implementations, the media processing instructions 266 may be divided into audio processing instructions and video processing instructions to facilitate audio processing-related processes and functions and video processing-related processes and functions, respectively.

Each of the above identified instructions and applications may correspond to a set of instructions for performing one or more functions described herein. These instructions need not be implemented as separate software programs, procedures, or modules. The memory 250 may include additional instructions or fewer instructions. Furthermore, various functions of the computing device 112/114 may be implemented in hardware and/or in software, including in one or more signal processing and/or application specific integrated circuits.

Figure 3:
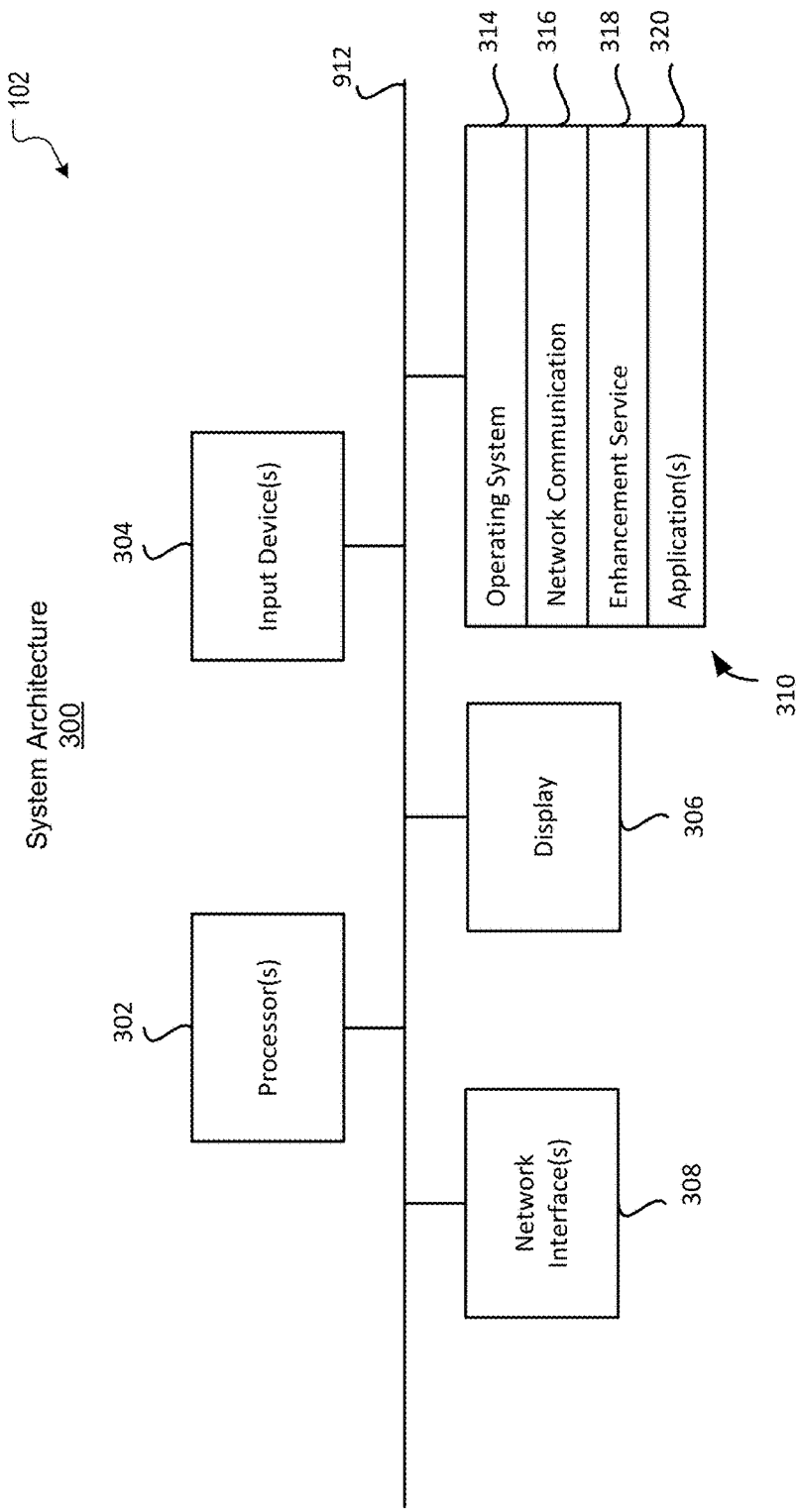
FIG. 3 shows a system architecture according to an embodiment of the invention.

FIG. 3 is a block diagram of an example system architecture 300 that may implement the features and processes associated with server device 102 described herein.

The architecture 300 may be implemented on any electronic device that runs software applications derived from compiled instructions, including without limitation personal computers, servers, smart phones, media players, electronic tablets, game consoles, email devices, etc. In some implementations, the architecture 300 may include one or more processors 302, one or more input devices 304, one or more display devices 306, one or more network interfaces 308, and one or more computer-readable mediums 310. Each of these components may be coupled by bus 312.

Display device 306 may be any known display technology, including but not limited to display devices using Liquid Crystal Display (LCD) or Light Emitting Diode (LED) technology. Processor(s) 302 may use any known processor technology, including but not limited to graphics processors and multi-core processors. Input device 304 may be any known input device technology, including but not limited to a keyboard (including a virtual keyboard), mouse, track ball, and touch-sensitive pad or display. Bus 312 may be any known internal or external bus technology, including but not limited to ISA, EISA, PCI, PCI Express, NuBus, USB, Serial ATA or FireWire. Computer-readable medium 310 may be any medium that participates in providing instructions to processor(s) 302 for execution, including without limitation, non-volatile storage media (e.g., optical disks, magnetic disks, flash drives, etc.), or volatile media (e.g., SDRAM, ROM, etc.).

Computer-readable medium 310 may include various instructions 314 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 304; sending output to display device 306; keeping track of files and directories on computer-readable medium 310; controlling peripheral devices (e.g., disk drives, printers, etc.) which can be controlled directly or through an I/O controller; and managing traffic on bus 312. Network communications instructions 316 may establish and maintain network connections (e.g., software for implementing communication protocols, such as TCP/IP, HTTP, Ethernet, etc.).

Enhancement service instructions 318 can include instructions that provide enhancement service 104 described herein. For example, enhancement service instructions 318 may serve content from content database 106 in response to device 112/114 requests as described herein.

Application(s) 320 may be an application that uses or implements the processes described herein and/or other processes. The processes may also be implemented in operating system 314.

The described features may be implemented advantageously in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Call Enhancement

Figure 4:
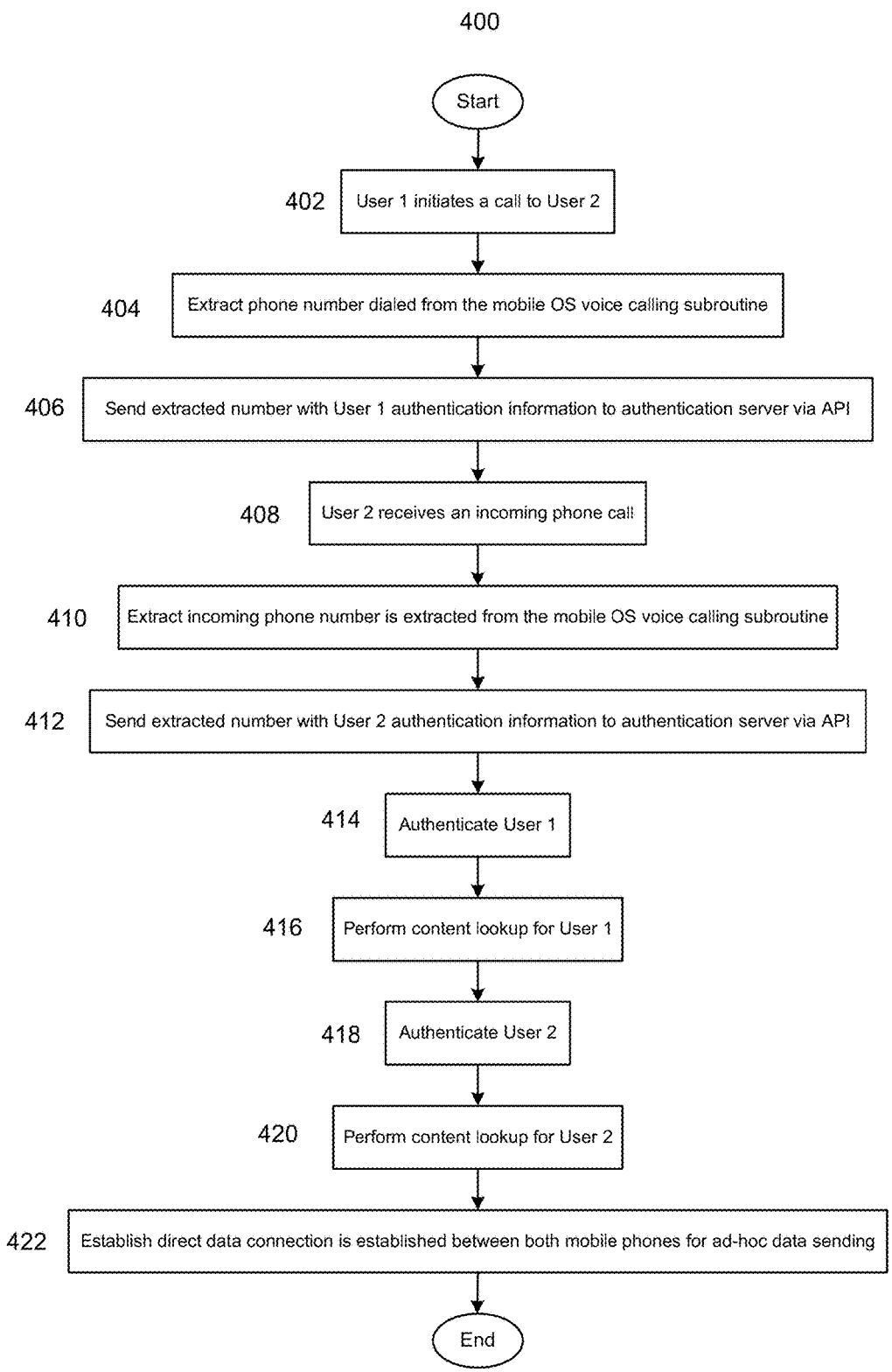
FIG. 4 shows a call enhancement process according to an embodiment of the invention.

FIG. 4 shows a call enhancement process 400 according to an embodiment of the invention. Process 400 may be performed by devices shown in FIG. 1, for example user 1 device 112, user 2 device 114, and/or server device 102. Process 400 may establish one or more connections between user 1 device 112 and server device 102, between user 2 device 114 and server device 102, and/or between user 1 device 112 and user 2 device 114. Through the one or more connections, users of user devices 112, 114 may share content with one another during a cellular call and/or add other call-enhancing elements to the call. Process 400 may be triggered when one of the user devices, which may be equipped with an app or other call enhancement systems, initiates a call to the other.

At step 402, user 1 may initiate a call to user 2 on the cell carrier network (cell/TDM) or other calling network 110. Enhanced calling systems of user 1 device 112 may determine that the call has been placed.

At step 404, user 1 device 112 may extract the identifier (e.g., phone number or other identifier, e.g., IP address, username, Bluetooth address, audio identifier, etc.) from data or metadata associated with the initiated call. For example, the phone number may be found in a voice calling subroutine of the mobile operating system of user 1 device 112 in some embodiments. In these embodiments, user 1 device 122 may extract the phone number from the voice calling subroutine data.

At step 406, user 1 device 112 may send the extracted identifier to server device 102. User 1 device 112 may also send user 1 authentication information. For example, authentication information may include a user identifier, account password, combination thereof, or other uniquely identifying data that server device 102 may use to locate content and/or other call-enhancing elements associated with user 1 in content database 106. User 1 device 112 may send the identifier and/or authentication information to the server through an API.

At step 408, user 2 device 114 may receive the call initiated by user 1 at step 402. Enhanced calling systems of user 2 device 114 may determine that the call has been received.

At step 410, user 2 device 114 may extract the identifier from data or metadata associated with the received call. For example, the phone number may be found in a voice calling subroutine of the mobile operating system of user 2 device 114 in some embodiments. In these embodiments, user 2 device 114 may extract the phone number from the voice calling subroutine data.

At step 412, user 2 device 114 may send the extracted identifier to server device 102. User 2 device 114 may also send user 2 authentication information. For example, authentication information may include a user identifier, account password, combination thereof, or other uniquely identifying data that server device 102 may use to locate content and/or other call-enhancing elements associated with user 2 in content database 106. User 2 device 114 may send the identifier and/or authentication information to the server through an API.

At step 414, server device 102 may authenticate user 1. For example, server device 102 may identify a user account associated with the user 1 authentication information sent by user 1 device 112. The user account may provide access to content available either by a general multi-person profile containing stored or linked video, audio and/or web content; or by a specific targeted, single-person profile containing stored or linked video, audio and/or web content.

At step 416, user 1 device 112 and/or server device 102 may perform a content lookup process for user 1. For example, user 1 device 112 may search a local cache in user 1 device 112 memory for content and/or other call-enhancing elements stored on device or previously retrieved from server device 102 and cached. Additionally and/or alternatively, server device 102 may look up data associated with user 1 in content database 106. The content database 106 lookup may be performed in response to a request from user 1 device 112 for a specific call-enhancing element and/or automatically so that call-enhancing elements can be identified and presented to the user of user 1 device 112 for selection. Additionally and/or alternatively, user 1 device 112 may obtain call-enhancing elements directly from user 2 device 114, as described below (e.g., see step 422). If the same content is found in multiple locations, user 1 device 122 may compare time stamps in content metadata to see which version of the content is the most recently updated version. User 1 device 112 may use the most recently updated version of the content.

In some embodiments and/or situations, steps 414 and/or 416 may be performed before and/or concurrently with steps 408-412. For example, user 1 device 112 may be authenticated and/or may gather content while user 2 device 114 is receiving the call, extracting the identifier, and communicating with server device 102.

At step 418, server device 102 may authenticate user 2. For example, server device 102 may identify a user account associated with the user 2 authentication information sent by user 2 device 114. The user account may provide access to content available either by a general multi-person profile containing stored or linked video, audio and/or web content; or by a specific targeted, single-person profile containing stored or linked video, audio and/or web content.

At step 420, user 2 device 114 and/or server device 102 may perform a content lookup process for user 2. For example, user 2 device 114 may search a local cache in user 2 device 114 memory for call-enhancing elements stored on device or previously retrieved from server device 102 and cached. Additionally and/or alternatively, server device 102 may look up data associated with user 2 in content database 106. The content database 106 lookup may be performed in response to a request from user 2 device 114 for a specific call-enhancing element and/or automatically so that call-enhancing elements can be identified and presented to the user of user 2 device 114 for selection. Additionally and/or alternatively, user 2 device 114 may obtain call-enhancing elements directly from user 1 device 112, as described below (e.g., see step 422). If the same content is found in multiple locations, user 2 device 114 may compare time stamps in content metadata to see which version of the content is the most recently updated version. User 2 device 114 may use the most recently updated version of the content.

In some embodiments and/or situations, steps 418 and/or 420 may be performed before and/or concurrently with steps 414 and/or 416. For example, user 1 device 112 and user 2 device 114 may be authenticated and/or may gather call-enhancing elements concurrently and/or in any order.

At step 422, user 1 device 112 and user 2 device 114 may establish a direct data connection between one another. For example, if user 1 device 112 determines that the most recent or relevant content is available directly from user 2 device 114, user 1 device 112 and user 2 device 114 may establish a direct IP connection. User 1 device 112 and user 2 device 114 may establish the direct IP connection using native authentication (e.g., provided by enhanced calling instructions 272) over calling network 110 or over another wireless (e.g., WiFi, Bluetooth, UWB, or other RF or optical signal) or wired IP network available to user 1 device 112 and user 2 device 114. In this example, an API local to user 1 device 112 (e.g., provided by enhanced calling instructions 272) may request content and/or other information from user 2 device 114 through the direct connection.

In some embodiments, user 1 device 112 and user 2 device 114 may establish a network connection using non-audible and audible sound frequencies, allowing a network to be established outside of IP communication direct between user 1 device 112 and user 2 device 114 over the voice channel of calling network 110.

In some embodiments and/or for some types of information transfer (e.g., transfer of sensitive or secured information), user 1 device 112 and user 2 device 114 may establish a temporary virtual private network (VPN) to assure the security protection of the information transferred. This in-call VPN may serve as the backbone of secure direct communication between the two or more devices (e.g., user 1 device 112 and user 2 device 114) involved in the call.

User 1 device 112 and user 2 device 114 may use the direct data connection for content lookup and sharing. For example, as noted above, user devices 112, 114 may request content from one another over the direct data connection. This may occur in situations where one of user devices 112, 114 has content the user wishes to share that is not available on the other user device 112, 114 or content database 106, or as part of a tiered hunt system wherein each possible source of content (local memory, database 106, other device) is searched and the version with the most recent timestamp is selected.

For example, user devices 112, 114 may utilize a network location hunt group to find the most relevant information and content to be shared. For example, a hunt by user 1 device 112 may start looking for content in a local cache, move to content database 106 next, move to any external website and/or database indicated by enhancement service 104 next, and user 2 device 114 last. If there are additional users on the call, their devices may also be included in the hunt group. The hunt may also aggregate information from each of the different content storage locations. For example, in the case of having more than two devices on a call (e.g., 3 way calling or conference calling), information may be pulled from multiple locations and provided to user 1 device 112 for access by the user.

User 1 device 112 and user 2 device 114 may use the direct data connection for ad-hoc sending of media or information from locally stored sources (e.g., memory of respective devices 112, 114) and/or from information input during the call (e.g., through user interaction with one or more device 112, 114 applications, for example a photo taken by a user during the call).

User 1 device 112 and user 2 device 114 may use the direct data connection to exchange control and signaling information to provide additional services above and beyond, or instead of, providing the stored content. For example, control and signaling information may include tagging of voice calls as "Urgent" using audio and visual identifications. Control and signaling information may include sending ad-hoc information between mobile handsets such as location, VCard information, contextual social media requests, etc.

Example Use Cases

Figure 5A:
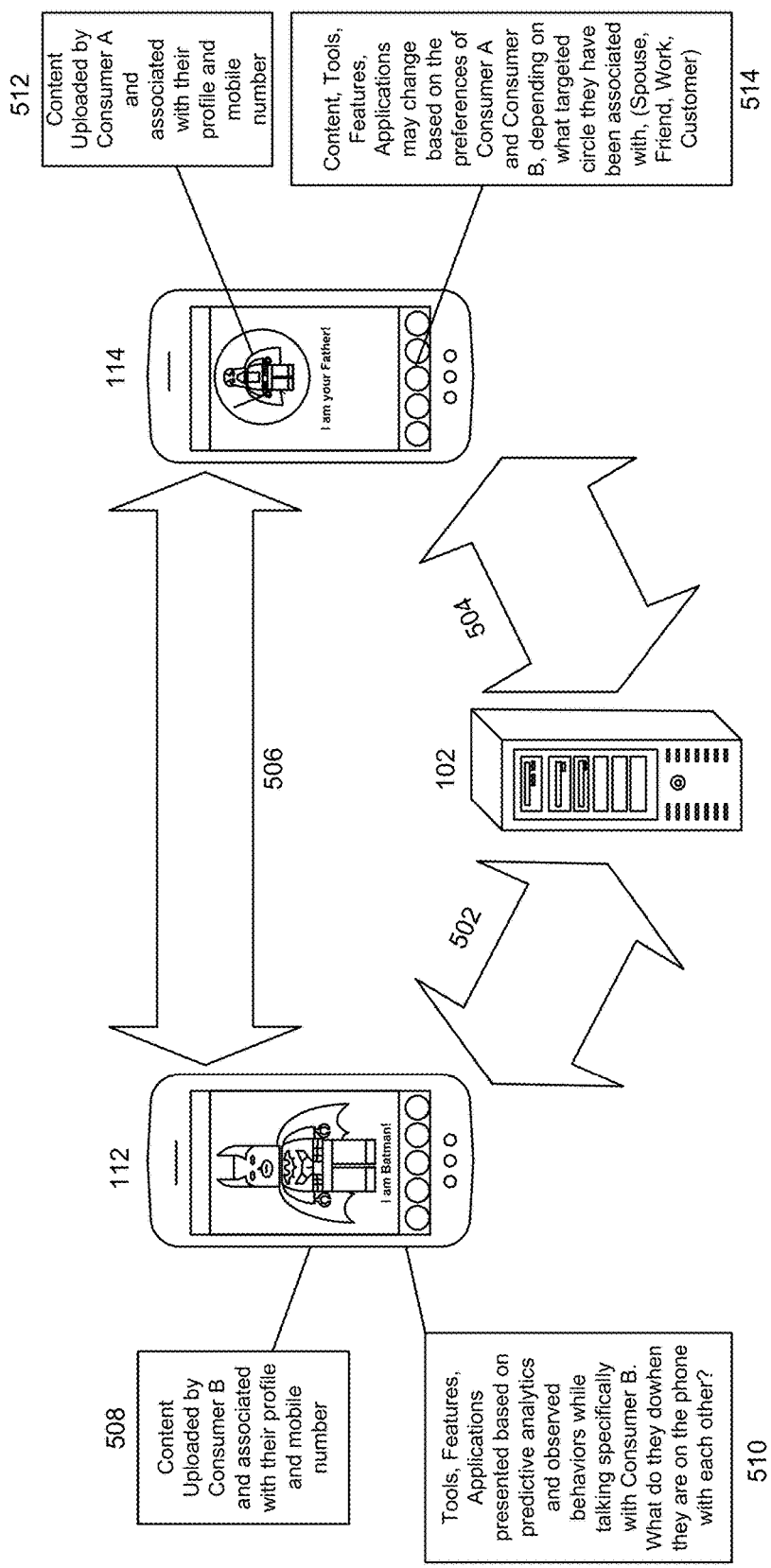
FIG. 5A shows an enhanced phone call scenario according to an embodiment of the invention.

FIG. 5A shows an enhanced phone call scenario according to an embodiment of the invention. In this scenario, a call may have been established according to process 400 of FIG. 4, for example, with communication channel 502 between user 1 device 112 and server device 102, communication channel 504 between user 2 device 114 and server device 102, and communication channel 506 between user 1 device 112 and server device 102.

As shown in FIG. 5A, user 1 device 112 may receive and display user 2 content 508, which may include uploaded or otherwise provided by user 2 and associated with user 2's profile and mobile identifier. For example, user 2 may wish to share a content element with user 1 and may enter a command to that effect through user 2 device 114. User 1 device 112 may receive information identifying the content element from user 2 device 114 (e.g., through communication channel 506). User 1 device 112 may obtain the content element in its own memory, by requesting a search of content database 106 by enhancement service 104 of server device 102, and/or from user 2 device 114 through communication channel 506. In the event multiple copies of the content element are found, user 1 device 112 may select and display the most recently created or edited version.

Similarly, user 2 device 114 may receive and display user 1 content 512, which may include uploaded or otherwise provided by user 1 and associated with user 1's profile and mobile phone number. For example, user 1 may wish to share a content element with user 2 and may enter a command to that effect through user 1 device 112. User 2 device 114 may receive information identifying the content element from user 1 device 112 (e.g., through communication channel 506). User 2 device 114 may obtain the content element in its own memory, by requesting a search of content database 106 by enhancement service 104 of server device 102, and/or from user 1 device 112 through communication channel 506. In the event multiple copies of the content element are found, user 2 device 114 may select and display the most recently created or edited version.

User 1 device 112 and user 2 device 114 may include context-sensitive UIs (e.g., UI 510 of user 1 device 112 and UI 514 of user 2 device 114). UIs 510, 514 may present user-selectable options based on one or more factors related to the call. For example, options presented in UI 510 may be based on predictive analytics and observed behaviors of user 1 while talking specifically with user 2. If user 1 frequently uses one or more call enhancement features, and/or selects one or more specific content elements, during calls with user 2, UI 510 may present options for selecting those features and/or elements. In another example, options presented in UI 514 may be based on the preferences of user 2 regarding user 1. If user 2 has identified certain call enhancement features and/or content elements as being important for use in calls with user 1 (e.g., in a settings menu or call menu of a call enhancement app or the like), UI 514 may present options for selecting those features and/or elements. User 2 device 114 may automatically determine that these enhancement features and/or content elements are important as well (e.g., based on the designation of user 1 as having a specific relationship to user 2 such as a spouse or member of a friend or work circle or the like).

Figure 5B:
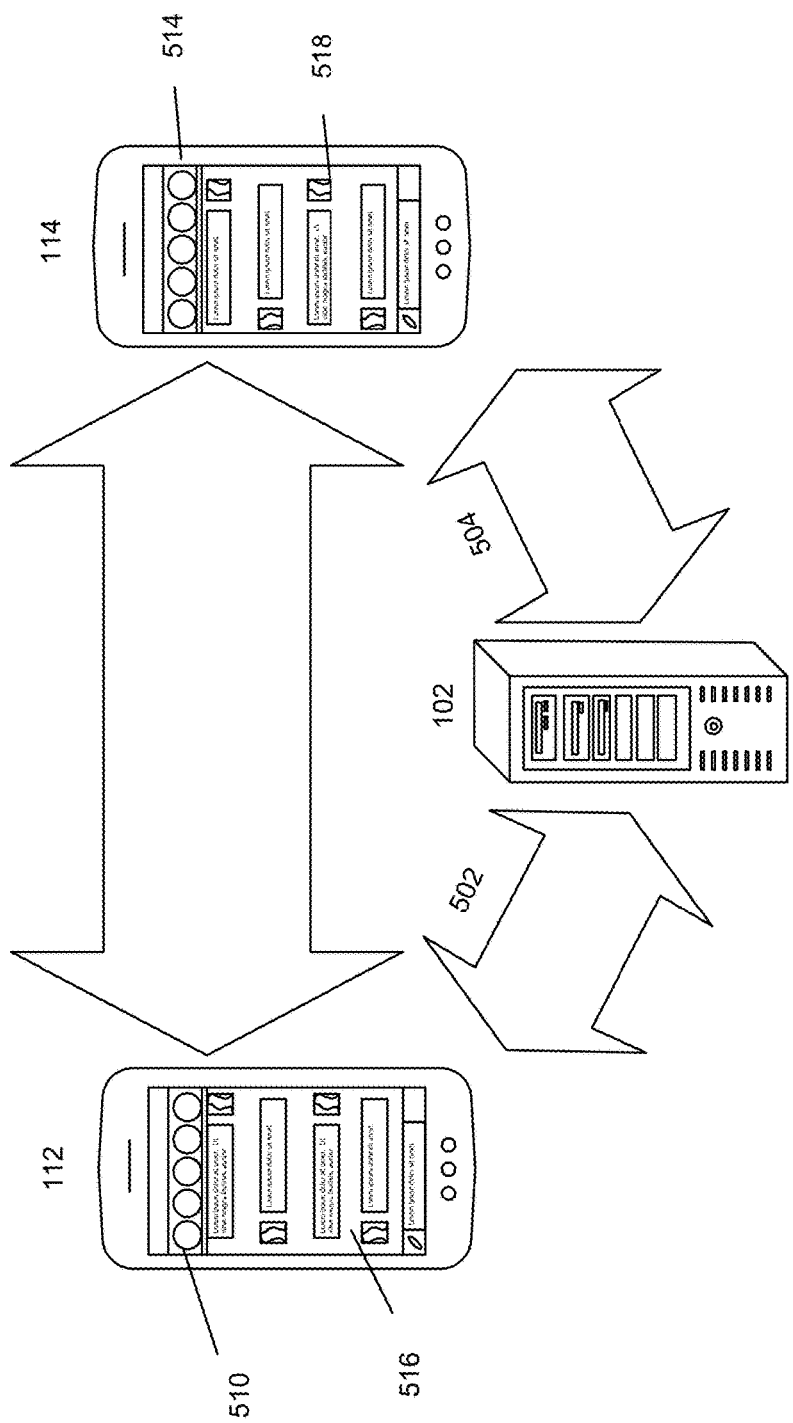
FIG. 5B shows an enhanced text message scenario according to an embodiment of the invention.

FIG. 5B shows an enhanced text message scenario according to an embodiment of the invention. This scenario may be similar to the call scenario of FIG. 5A, wherein a text messaging chain may have been established according to process 400 of FIG. 4, for example, with communication channel 502 between user 1 device 112 and server device 102, communication channel 504 between user 2 device 114 and server device 102, and communication channel 506 between user 1 device 112 and server device 102. As in the calling scenario, devices 112 and 114 may extract sender and recipient phone numbers from the text message data as messages are sent and/or received.

As in FIG. 5A, user 1 device 112 may present context-sensitive UI 510, and user 2 device 114 may present context-sensitive UI 514, and these UIs 510, 514 may function similarly to those of FIG. 5A. However, they may be used to insert content into text messages (e.g., message 516 of user 1 device 112 and/or message 518 of user 2 device 114). User devices 112, 114 may also include default enhancements, for example providing each user to connect with one another through social media platforms within the text messages 516, 518.

Figure 6:
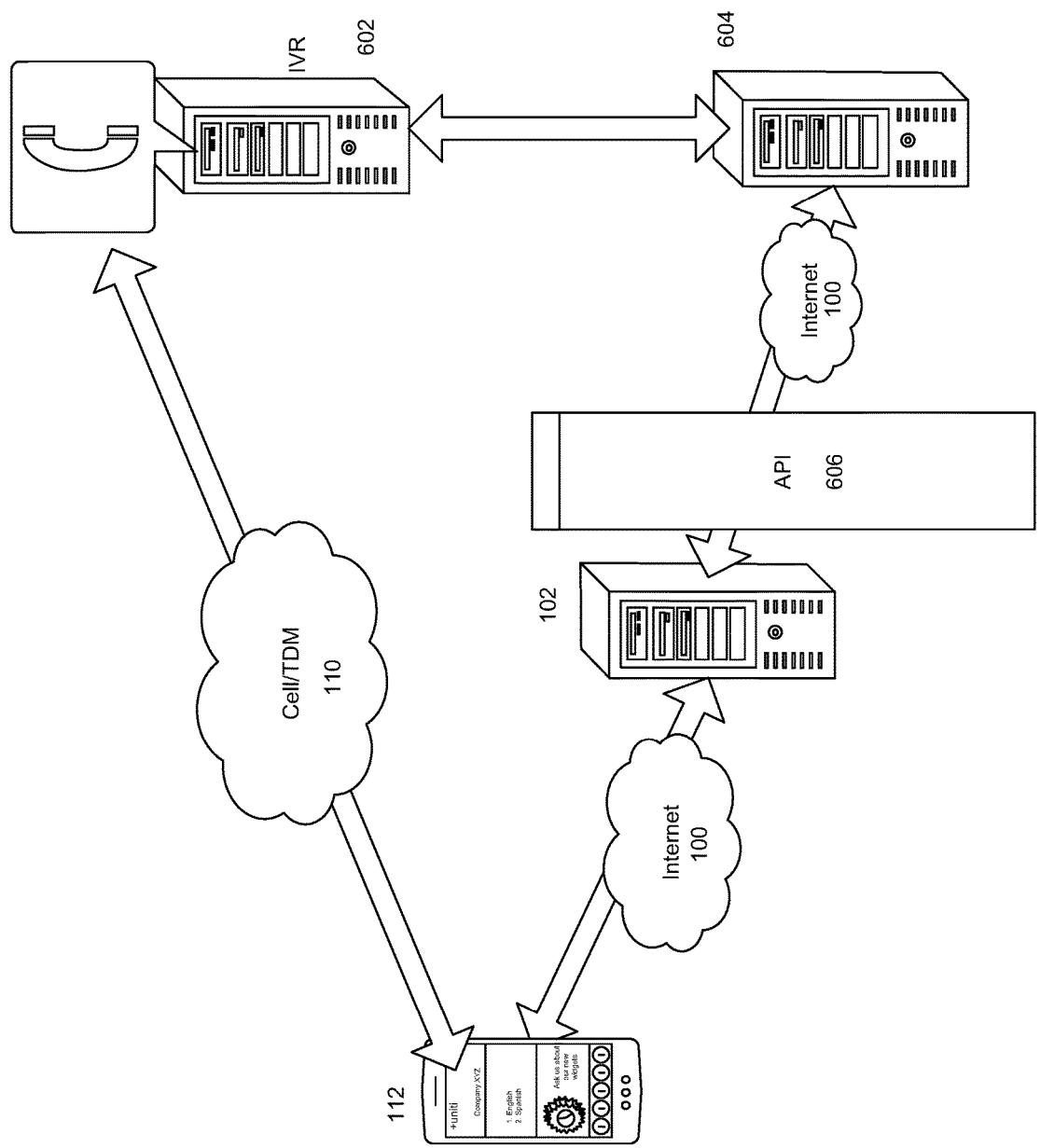
FIG. 6 shows an enhanced consumer to business call scenario according to an embodiment of the invention.

FIG. 6 shows an enhanced consumer to business call scenario according to an embodiment of the invention. In this scenario, one party to the call is user 1 on user 1 device 112, and the call is made through calling network 110, but the other party is a business system, for example comprising interactive voice response (IVR) device 602 and/or contact center device 604. IVR device 602 and/or contact center device 604 may each comprise one or more servers or other computers or elements thereof and, in some embodiments, may both be elements of a single server or other computer.

In this scenario, a call may have been established according to process 400 of FIG. 4, for example, with user 1 device 112 and IVR 602 communicating over cellular/TDM network 110, user 1 device 112 and server device 102 communicating over the Internet 100, and contact center device 604 and server device 102 communicating over the Internet 100 (e.g., using an API 606).

IVR 602 may provide enhanced call features to user 1 device 112 related to the products and/or services offered by the business. For example, IVR 602 may share content such as order information, order confirmations, visual data about products or services, etc. This content may be shared according to process 400, as discussed above. Likewise, user 1 device 112 may share content with IVR 602 according to process 400, such as dual tone multi frequency (DTMF) signals, location information of user 1 device 112, personal user identifying data, payment information, identity/authentication information for account access, etc.

Figure 7:
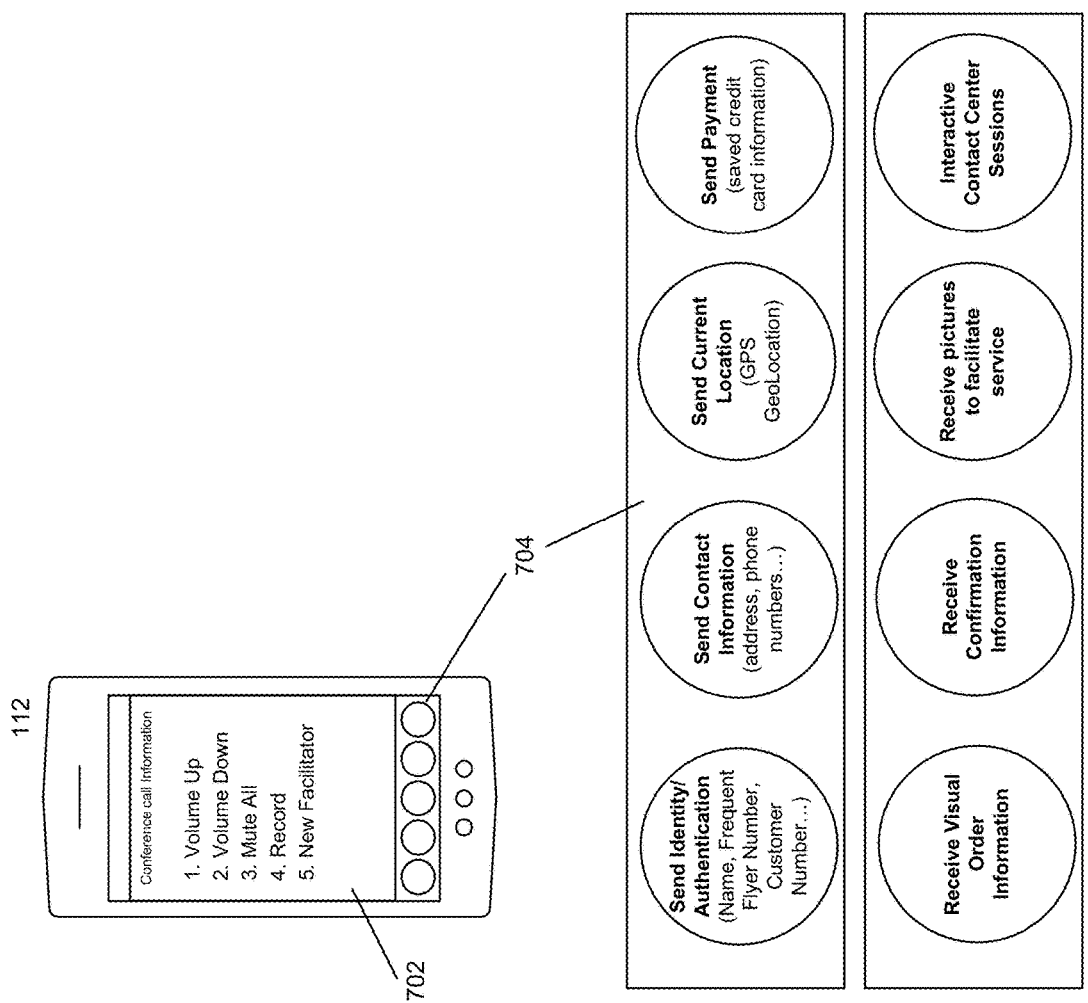
FIGS. 7-9 show call enhancement interfaces according to embodiments of the invention.
Figure 8:
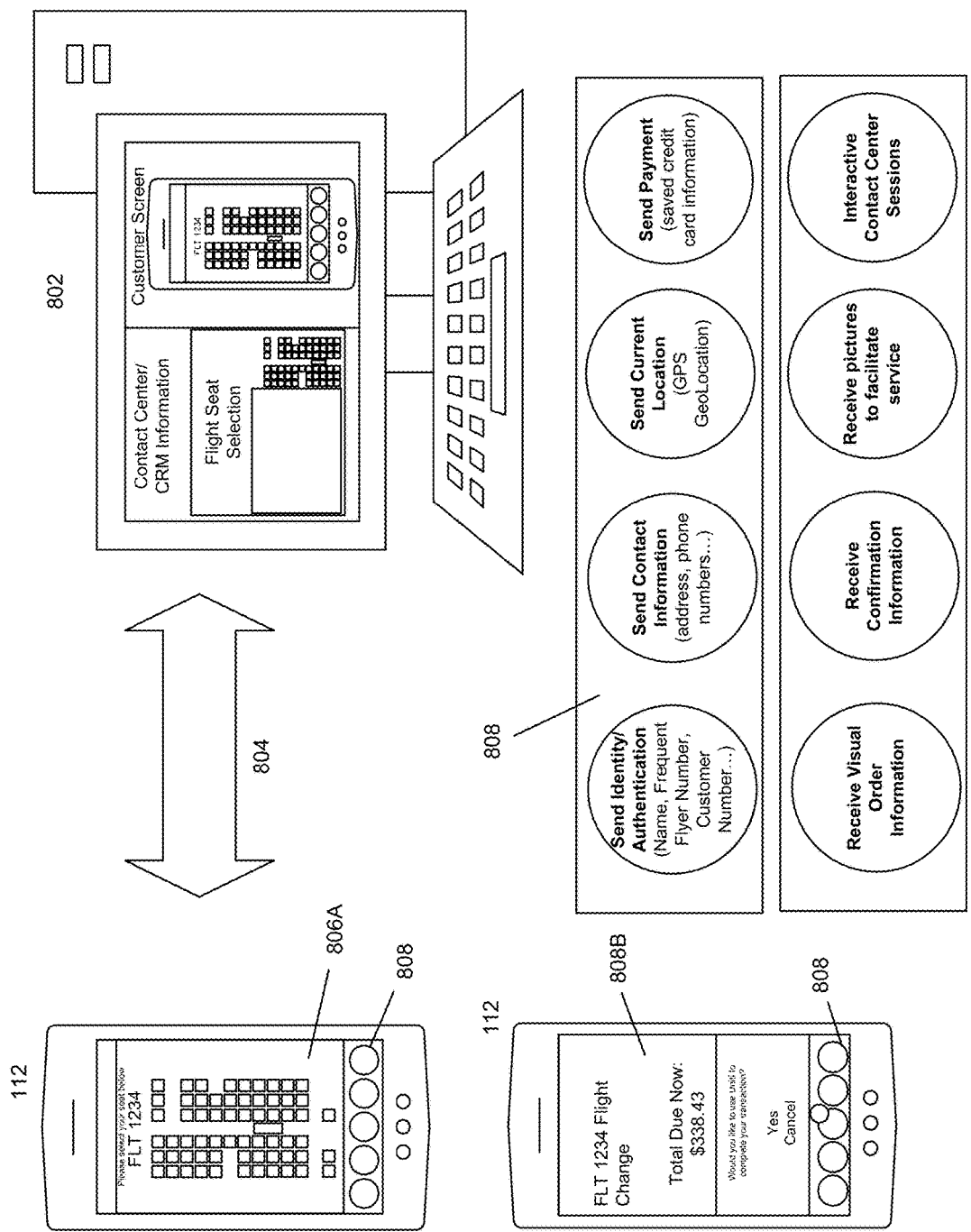
Figure 9:
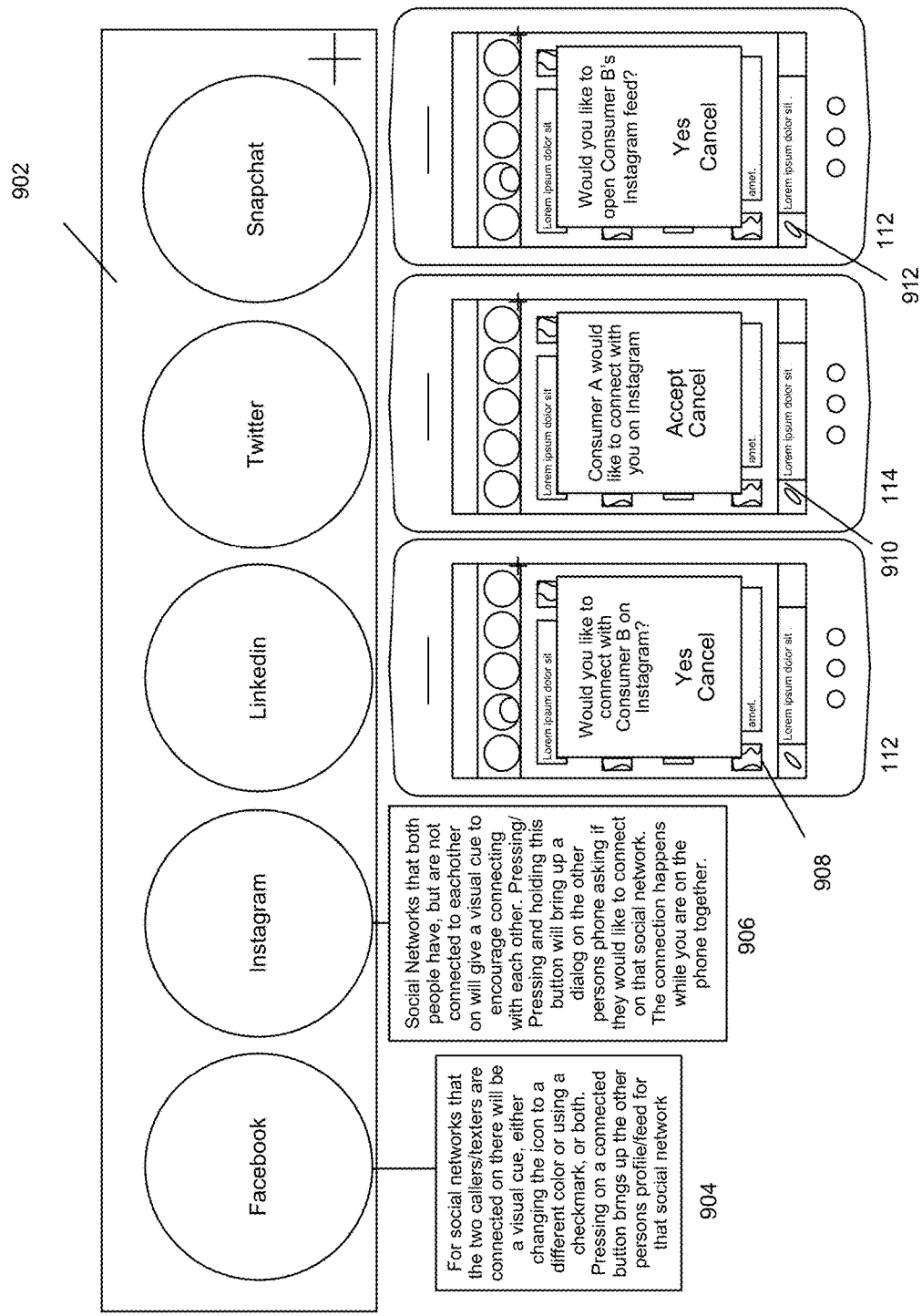

FIGS. 7-9 show call enhancement interfaces according to embodiments of the invention. In FIG. 7, interface 702 is a conference call information interface that may include options for adjusting volume, muting, recording, and/or changing conference facilitator. UI 704 may include options such as send identity/authentication, send contact information, send current location, send payment, receive visual order information, receive confirmation information, receive pictures, and/or interactive contact center sessions. When a user selects an option, user 1 device 112 and the other device on the call (e.g., user 2 device or IVR, not shown) may exchange call enhancement data (e.g., content) as discussed above in process 400 of FIG. 4.

In FIG. 8, interface 802 is an airline call center interface, and interfaces 806A/B are flight option interfaces (e.g., for picking seats and paying for seats). UI 808 may include options such as send identity/authentication, send contact information, send current location, send payment, receive visual order information, receive confirmation information, receive pictures, and/or interactive contact center sessions. User 1 device 112 and call center may exchange call enhancement data over connection 804, which may be established according to process 400 described above, for example. In this case, the call center can share content for interactively selecting flights and seats and paying for the selections, and the user device can share selections. While this example is presented in the context of an airline purchase, those of ordinary skill in the art will recognize that other transactions may be accomplished similarly.

FIG. 9 shows interfaces for social network interaction during a call which can be provided by process 400 of FIG. 4, as described above. For example, UI 902 may include options for selecting various social networks. Icons 904 for networks on which the user of user 1 device 112 and the user of user 2 device 114 are connected may be highlighted with a visual cue (e.g., a color, a checkmark, etc.). Selecting icon 904 may cause device 112, 114 to retrieve the social network information (e.g., the profile) of the other user on the call from the appropriate location on the Internet 100. In some embodiments, selecting icon 904 may cause the device (e.g., user 1 device 112) to show a confirmation prompt 912 which may be selected to confirm or deny accessing the social media content.

Icons 906 for networks on which both users are present but not connected may be highlighted with a different visual cue (e.g., a different color, etc.). Selecting icon 906 may cause device 112, 114 to connect with the other user on the selected social network on the Internet 100. In some embodiments, selecting icon 906 may cause both devices 112, 114 to show confirmation prompts 908, 910 which may be selected to confirm or deny the social media connection.

Figure 10A:
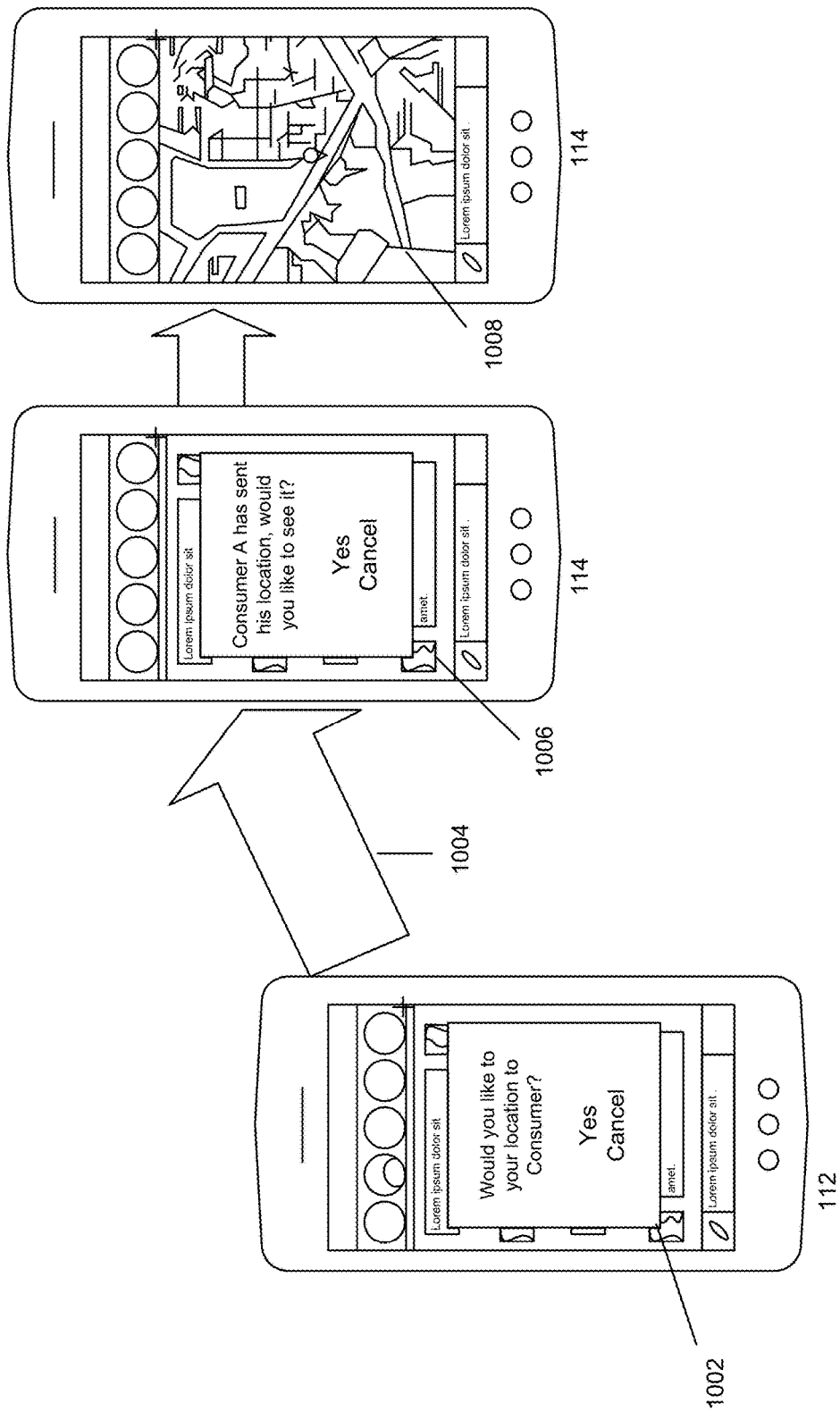
FIGS. 10A-10F show call enhancement features according to embodiments of the invention.

FIGS. 10A-10F show call enhancement features according to embodiments of the invention. These features may be employed by devices 112, 114 that have connected according to process 400 of FIG. 4, for example. In FIG. 10A, the user of user 1 device 112 may select an option to send their location to user 2 in device UI 1002. User 1 device 112 may share the device location (e.g., obtained by GPS, WiFi or cellular triangulation, or in some other way) over connection 1004 between devices 112, 114. User 2 device 114 may receive the data from user 1 and may present prompt 1006 allowing user 2 to access the data. If user 2 accepts the data, user 2 device 114 may display location 1008 sent by user 1 device 112.

Figure 10B:
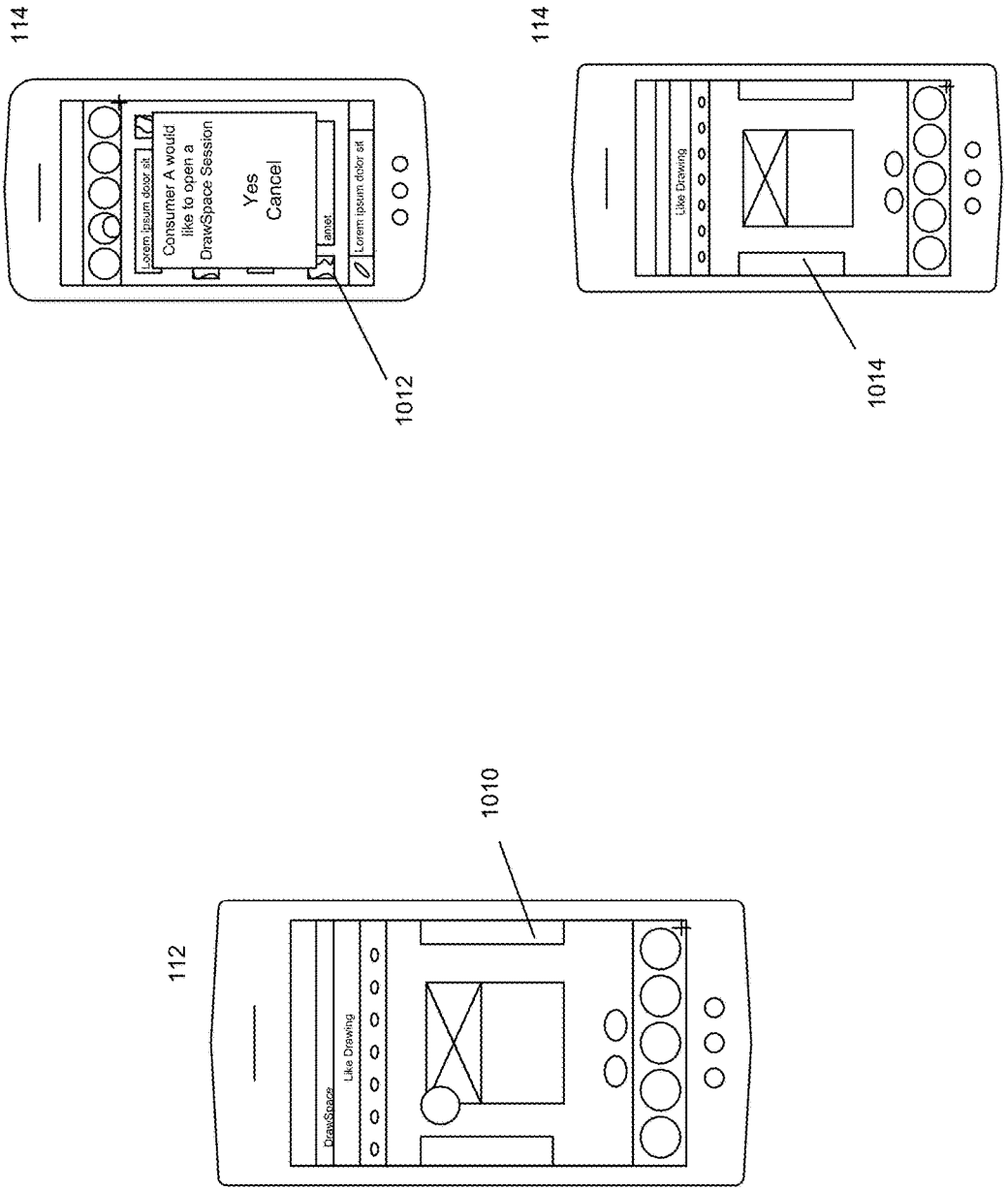

In FIG. 10B, the user of user 1 device 112 may use a drawing app or app feature 1010 to initiate a shared drawing session. User 1 device 112 may send an invitation to user 2 device 114 over the connection between devices 112, 114. User 2 device 114 may receive the data from user 1 and may present prompt 1012 allowing user 2 to access the data. If user 2 accepts the data, user 2 device 114 may display shared drawing session 1014 initiated by user 1 device 112. User devices 112, 114 may collaborate and share drawing data during the session over the connection between devices 112, 114. The drawing edits may be controlled by the initiating party, or the initiating party may be able to hand control over to the receiving party through a UI in the drawing app or feature.

Figure 10C:
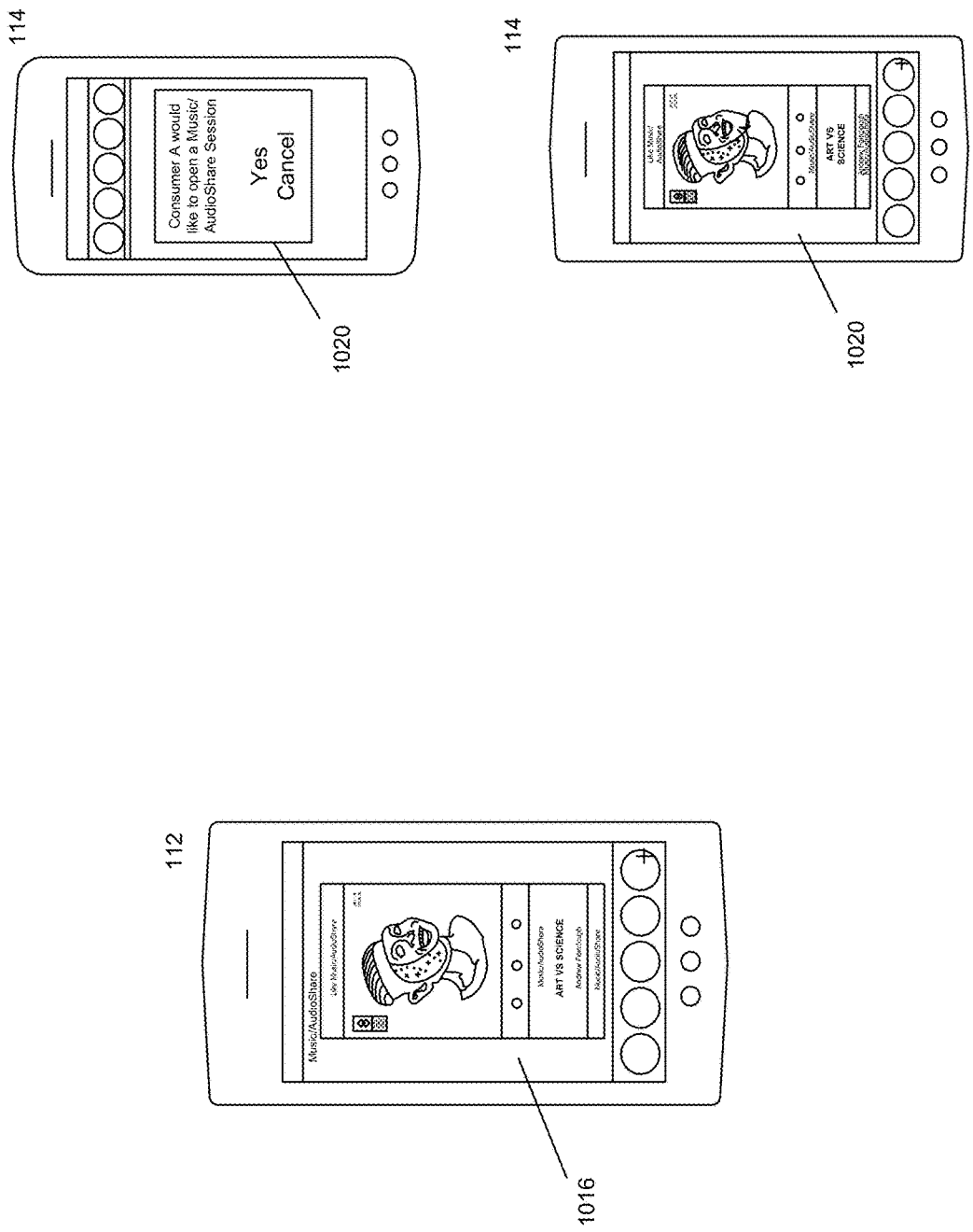

In FIG. 10C, the user of user 1 device 112 may use a music/audio sharing app or app feature 1016 to initiate a shared music/audio session. User 1 device 112 may send an invitation to user 2 device 114 over the connection between devices 112, 114. User 2 device 114 may receive the data from user 1 and may present prompt 1018 allowing user 2 to access the data. If user 2 accepts the data, user 2 device 114 may display shared music/audio session 1020 initiated by user 1 device 112. User devices 112, 114 may present the same music/audio during the session over the connection between devices 112, 1140. The music/audio selection may be controlled by the initiating party, or the initiating party may be able to hand control over to the receiving party through a UI in the music/audio sharing app or feature.

Figure 10D:
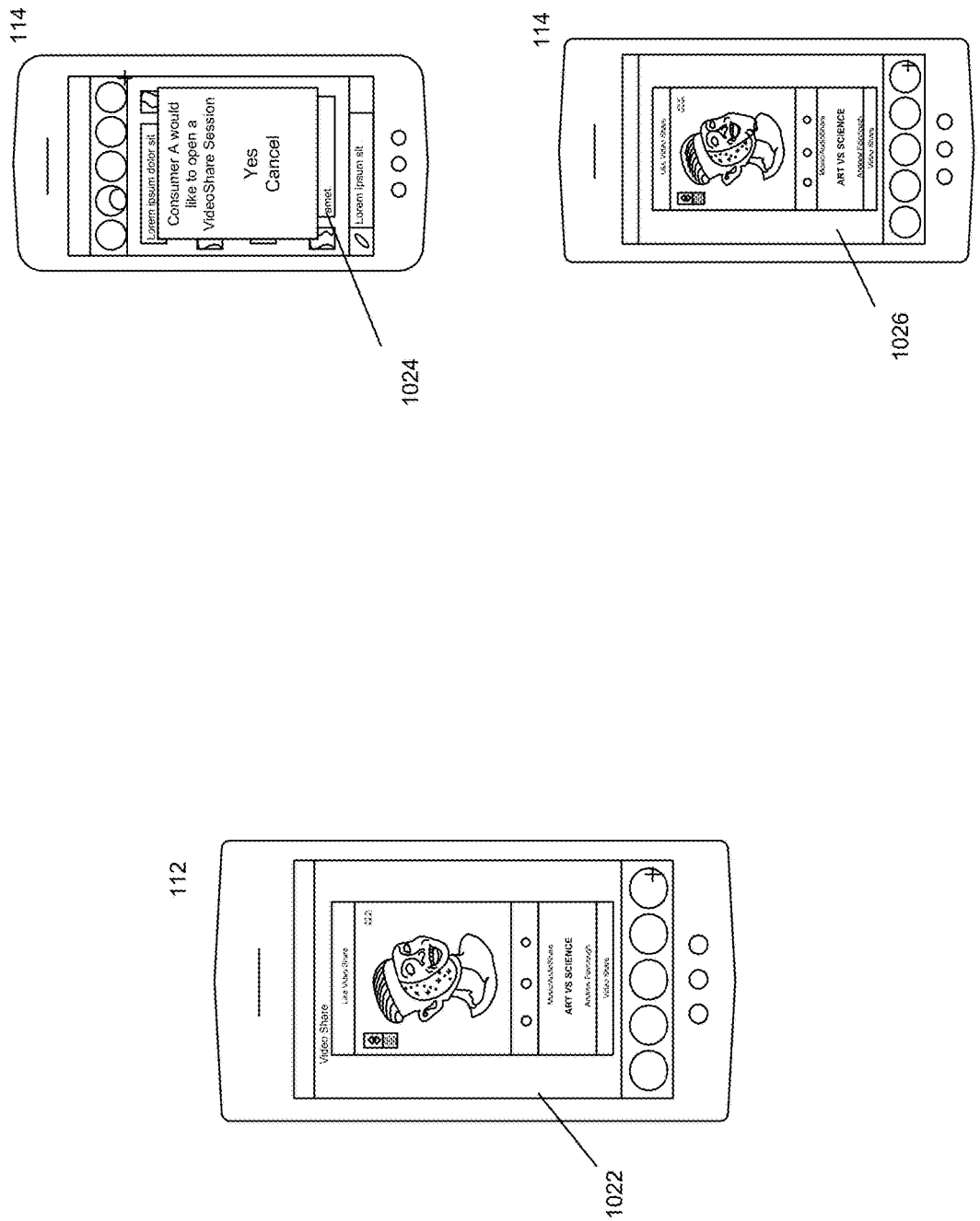

In FIG. 10D, the user of user 1 device 112 may use a video/image sharing app or app feature 1022 to initiate a shared video/image session. User 1 device 112 may send an invitation to user 2 device 114 over the connection between devices 112, 114. User 2 device 114 may receive the data from user 1 and may present prompt 1024 allowing user 2 to access the data. If user 2 accepts the data, user 2 device 114 may display shared video/image session 1026 initiated by user 1 device 112. User devices 112, 114 may present the same video/image during the session over the connection between devices 112, 114. The video/image selection may be controlled by the initiating party, or the initiating party may be able to hand control over to the receiving party through a UI in the video/image sharing app or feature.

Figure 10E:
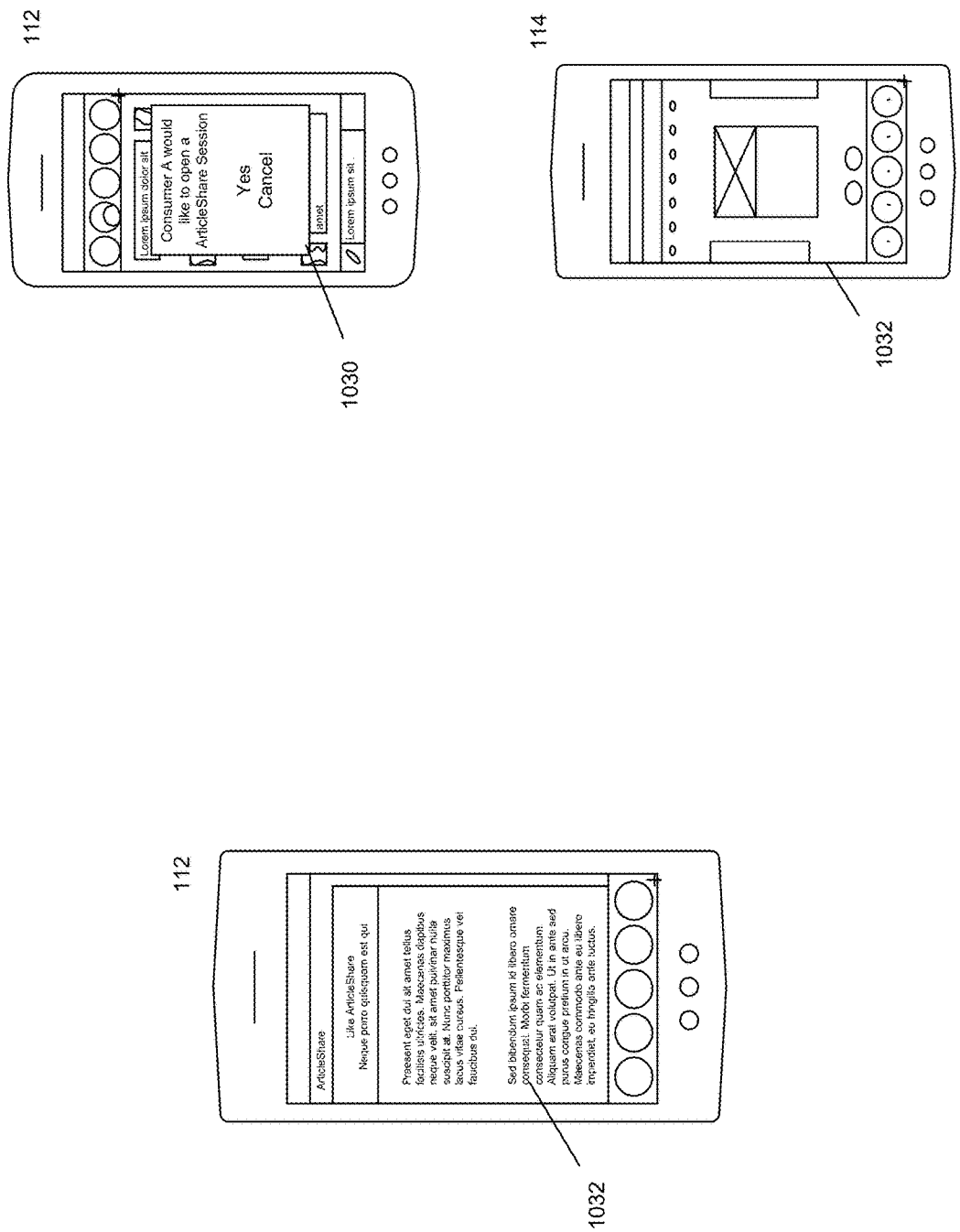

In FIG. 10E, the user of user 1 device 112 may use a text sharing app or app feature 1028 to initiate a shared text session (e.g., to share an article or other document). User 1 device 112 may send an invitation to user 2 device 114 over the connection between devices 112, 114. User 2 device 114 may receive the data from user 1 and may present prompt 1030 allowing user 2 to access the data. If user 2 accepts the data, user 2 device 114 may display shared text session 1032 initiated by user 1 device 112. User devices 112, 114 may present the same text during the session over the connection between devices 112, 114. The text selection may be controlled by the initiating party, or the initiating party may be able to hand control over to the receiving party through a UI in the text sharing app or feature.

Figure 10F:
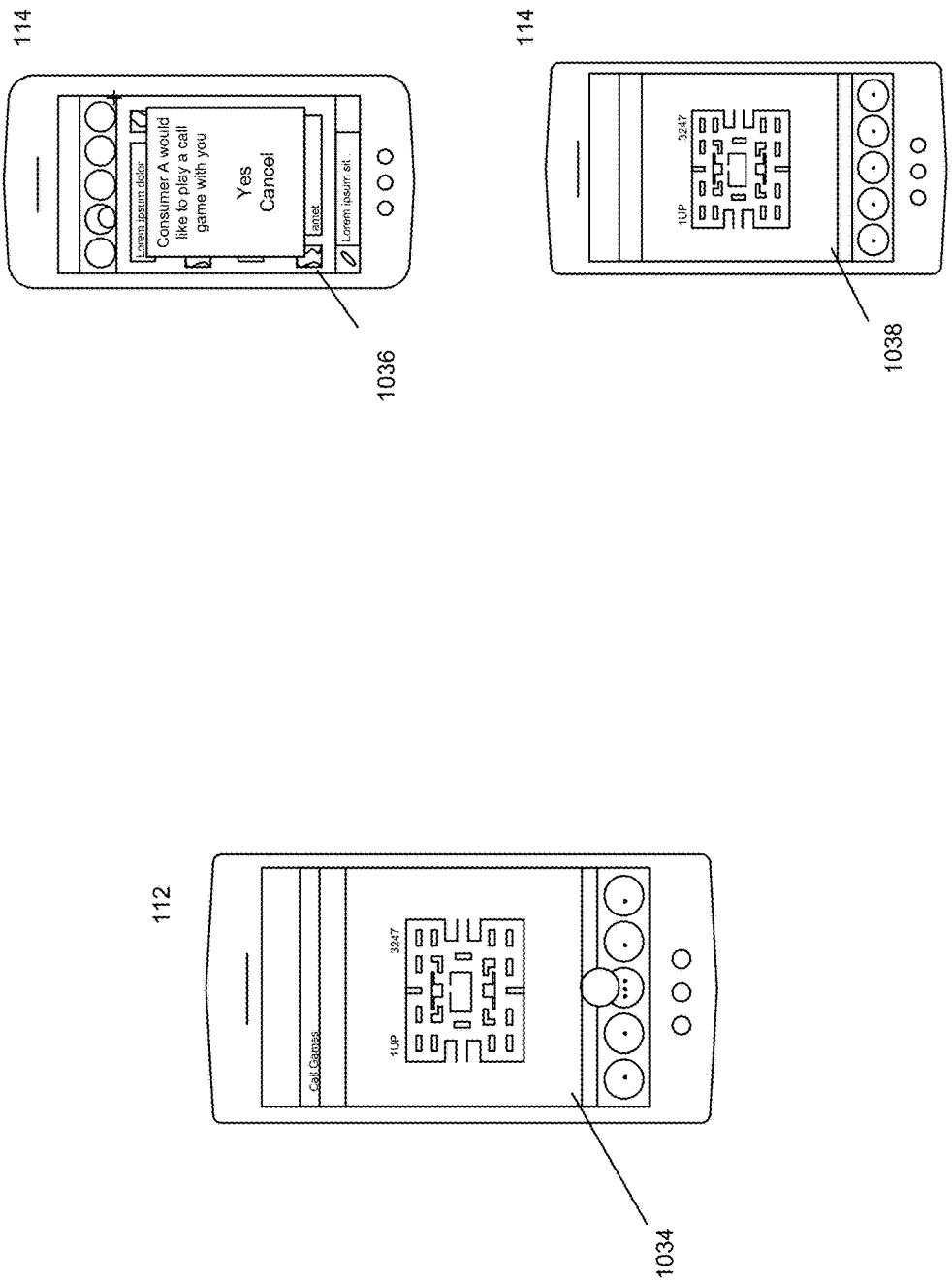

In FIG. 10F, the user of user 1 device 112 may use a gaming app or app feature 1034 to initiate a shared gaming session. User 1 device 112 may send an invitation to user 2 device 114 over the connection between devices 112, 114. User 2 device 114 may receive the data from user 1 and may present prompt 1036 allowing user 2 to access the data. If user 2 accepts the data, user 2 device 114 may display shared gaming session 1038 initiated by user 1 device 112. User devices 112, 114 may each receive input from their respective users to allow the users to play a game with one another.

Figure 11A:
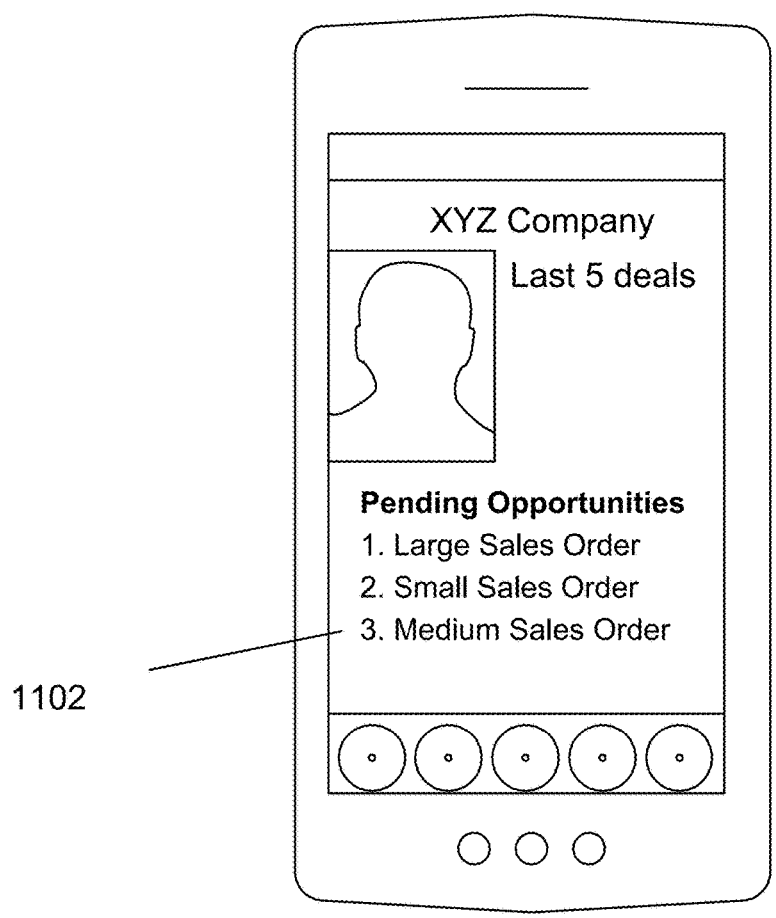
FIGS. 11A-11B show external application integration features according to embodiments of the invention.
Figure 11B:
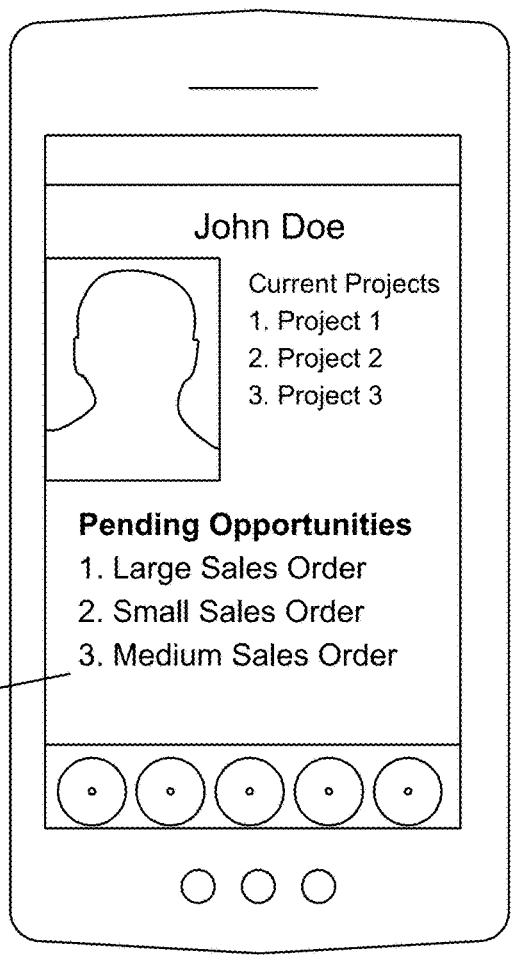

FIGS. 11A-11B show external application integration features according to embodiments of the invention. For example, as discussed above, companies can receive calls from customers, and the respective devices may establish connections according to process 400 of FIG. 4. When the connections are established, user device 112, 114 may be able to access systems/applications provided by company devices during the call. For example, in FIG. 11A, user 1 device 112 accesses a CRM application UI 1102. In FIG. 11B, user 1 device 112 accesses a collaboration or service tool.

Example Call-Enhancing Elements

The above discussion details how content and/or other call-enhancing elements may be shared among devices. Note that while "content" is given as an example call-enhancing element throughout the description, other call-enhancing elements may be handled similarly to content. The following is a representative, but non-exhaustive, sample of call-enhancing elements that may be shared according to the systems and methods described herein.

- Call-enhancing element to open a specific application when dialing (e.g., entering using digits, or a name based on saved digits) a specific number on a mobile device.
- Call-enhancing element to open a specific app when dialing a specific number on a communications device (e.g., office or home phone).
- Call-enhancing element to open a specific webpage when dialing a specific number on a mobile device.
- Call-enhancing element to queue an application for download from within a call application.
- Call-enhancing element to download an app from within a mobile call.
- Call-enhancing element to combine voice and data in a single call environment over built-in services.
- Call-enhancing element providing a data transfer platform while on a phone call.
- Call-enhancing element for sharing a mobile device screen with another mobile device.
- Call-enhancing element for sharing a mobile device screen with a non-mobile device (e.g., providing an interactive data session in-call).
- Call-enhancing element for opening a simultaneous voice and data call to the same device.
- Call-enhancing element for receiving a simultaneous voice and data call from the same device.
- Call-enhancing element providing direct acquisition of a data recipient based on a specific number dialed.
- Call-enhancing element providing direct targeting by an application based on a specific number dialed.
- Call-enhancing element for receiving an incoming location identifier while in a call via a data channel.

Call-enhancing element for identifying most frequently used in call buttons.

Call-enhancing element for arranging buttons based on in-call usage.

Call-enhancing element for providing a user-generated customizable audio tone or assigned song as part of a call announcement.

Call-enhancing element for placing options on a mobile phone screen that correspond with a target company's IVR/auto-attendant system.

Call-enhancing element for automatically importing phone IVR options.

Call-enhancing element for hand gesture (touch sequence, swipe or button) to copy mobile device screen over to another screen (desktop, laptop, tablet, wearable (watch, glasses, rings, bracelet, projections)).

Call-enhancing element for transferring a call using a hand gesture to another phone (swipe, non-touch gesture, shake).

Call-enhancing element for placing recently viewed articles into a call.

Call-enhancing element for sharing recently viewed articles with another caller.

Call-enhancing element for user-initiated simultaneous display of an article on two different devices.

Call-enhancing element for placing recently heard music into a call.

Call-enhancing element for sharing recently heard music with another caller.

Call-enhancing element for user-initiated simultaneous listening to music on two different devices.

Call-enhancing element for identifying a business contact, personal contact, or other specific contact group via specialized ring identification including ringtone, vibration, or lighting sequence on either a personal mobile device or wearable device.

Call-enhancing element for identifying contextual information from within a phone conversation.

Call-enhancing element for causing a mobile device to load information based on the information form a mobile conversation.

Call-enhancing element for assigning a task based on contextual conversation.

Call-enhancing element for capturing voice commands from within a phone call for the purposes of team collaboration.

Call-enhancing element for providing user-configurable templates containing pictures, moving pictures, and/or video within a phone call.

Call-enhancing element for simultaneously watching the same video on two different devices.

Call-enhancing element for combining a mobile device phone number and an IP address or set of IP addresses.

Call-enhancing element for providing an in-call browser.

Call-enhancing element for providing a video-enabled caller identification or announcement (Video Caller-ID).

Call-enhancing element for providing in-call electronic payments (caller-initiated in-call payment system from electronic wallet to another electronic wallet or other account).

Call-enhancing element for a mobile application to recognize a phone number and adjust its content accordingly.

Call-enhancing element for connecting to a social media account from within a phone call.

Call-enhancing element for providing a simultaneous drawing space on two mobile devices.

Call-enhancing element for playing simultaneous games while on a call.

Call-enhancing element for displaying advertising while on a call or in communication with another user.

Call-enhancing element for connecting to other systems to facilitate simultaneous voice and data communication between two mobile devices.

Call-enhancing element for combining facial and/or voice recognition to surface relevant content features, and tools on a mobile and/or wearable device.

Call-enhancing element for contextually identifying another person, or entity based on phone number, mobile number, IP address, voice recognition, or visual recognition from a mobile or wearable device.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a," "an," "the," "said," etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method of providing one or more enhanced communication features during a communication, the method comprising:

detecting a destination identifier for a communication sent by a first device, the destination identifier being an identifier associated with a second device;

detecting a source identifier for the communication sent by the first device, the source identifier being an identifier associated with the first device;

establishing a first connection between the first device and a server device, the server device comprising a database of call-enhancing elements;

establishing a second connection between the second device and the server device;

establishing a direct connection between the first device and the second device;

sharing, by at least one of the first connection, the second connection, and the direct connection, at least a first call-enhancing element with the first device and at least a second call-enhancing element with the second device, each call-enhancing element being associated with at least one of the source identifier and the destination identifier, wherein:

the first call-enhancing element comprises first content data including at least one of first audio content, first visual content, and first interactive content, and the second call-enhancing element comprises second content data different from the first content data, the second content data including at least one of second audio content, second video content, and second interactive content; and exchanging, by a separate connection from the at least one connection by which the first call-enhancing element and the second call-enhancing element are shared, communication data between the first device and the second device at the same time as the sharing.

2. The method of claim 1, wherein the communication is a phone call.

3. The method of claim 1, wherein the communication is a text message.

4. The method of claim 1, wherein at least one of the source identifier and the destination identifier is detected from data or metadata associated with the communication on at least one of the first device and the second device.

5. The method of claim 1, further comprising locating the at least one call-enhancing element.

6. The method of claim 5, wherein the locating comprises searching a memory of the first device or the second device, searching the database, requesting the at least one call-enhancing element over the direct connection, or a combination thereof.

7. The method of claim 5, wherein the locating comprises identifying multiple versions of the at least one call-enhancing element and selecting a most recent version.

8. The method of claim 1, wherein the at least one call-enhancing element comprises a graphic, an animation, a sound, a video, an interface, an interactive element, or a combination thereof.

9. The method of claim 1, wherein establishing the direct connection comprises:
establishing a direct IP connection over a cellular network, a wired network, or a wireless network;
establishing a virtual private network connection over the cellular network, the wired network, or the wireless network; or
establishing an audio connection over the cellular network.

10. The method of claim 1, wherein the sharing comprises performing a tiered hunt for the at least one call-enhancing element.

11. The method of claim 10, wherein the tiered hunt comprises:
performing a search of a local memory for the at least one call-enhancing element;
requesting the at least one call-enhancing element from the server device;
requesting the at least one call-enhancing element from at least one external source; and
requesting the at least one call-enhancing element from the first device or the second device.

12. The method of claim 1, wherein the destination identifier and the source identifier are phone numbers.

13. The method of claim 1, further comprising:
establishing at least one additional connection between at least one additional device and the server device;
establishing at least two additional direct connections between the first device and the at least one additional device and between the second device and the at least one additional device; and
sharing, by at least one of the at least one additional connection and the at least two additional direct connections, the call-enhancing element with the at least one additional device.

14. A device configured to provide one or more enhanced communication features during a communication, the device comprising:
at least one networking element configured to:
establish a first connection between the device and a server device, the server device comprising a database of call-enhancing elements; and
establish a direct connection between the device and a second device; and at least one processor configured to:
detecting a destination identifier for a communication sent by the device, the destination identifier being an identifier associated with the second device;
sharing, by at least one of the first connection and the direct connection, at least a first call-enhancing element with the second device, the first call-enhancing element being associated with at least one of a source identifier of the device and the destination identifier;
receiving, by at least one of the first connection and the direct connection, at least a second call-enhancing element, the second call-enhancing element being associated with at least one of a source identifier of the device and the destination identifier, wherein:
the first call-enhancing element comprises first content data including at least one of first audio content, first visual content, and first interactive content, and
the second call-enhancing element comprises second content data different from the first content data, the second content data including at least one of second audio content, second video content, and second interactive content; and
exchanging, by a separate connection from the at least one connection by which the first call-enhancing element and the second call-enhancing element are shared, communication data between the first device and the second device at the same time as the sharing.

15. The device of claim 14, wherein the communication is a phone call.

16. The device of claim 14, wherein the communication is a text message.

17. The device of claim 14, wherein the at least one processor is further configured to locate the at least one call-enhancing element.

18. The device of claim 17, wherein the locating comprises searching a memory of the first device, requesting the at least one call-enhancing element from the database, requesting the at least one call-enhancing element over the direct connection, or a combination thereof.

19. The device of claim 17, wherein the locating comprises identifying multiple versions of the at least one call-enhancing element and selecting a most recent version.

20. The device of claim 14, wherein the at least one call-enhancing element comprises a graphic, an animation, a sound, a video, an interface, an interactive element, or a combination thereof.

21. The device of claim 14, wherein establishing the direct connection comprises:
establishing a direct IP connection over a cellular network, a wired network, or a wireless network;
establishing a virtual private network connection over the cellular network, the wired network, or the wireless network; or
establishing an audio connection over the cellular network.

22. The device of claim 14, wherein the sharing comprises performing a tiered hunt for the at least one call-enhancing element.

23. The device of claim 22, wherein the tiered hunt comprises:
performing a search of a local memory for the at least one call-enhancing element;
requesting the at least one call-enhancing element from the server device;
requesting the at least one call-enhancing element from at least one external source; and
requesting the at least one call-enhancing element from the second device.

24. The device of claim 14, wherein the destination identifier and the source identifier are phone numbers.

25. A server device configured to provide one or more enhanced communication features during a communication, the server device comprising:
a database of call-enhancing elements;
a networking element configured to:
establish a first connection between a first device and the server device based on a source identifier for a communication sent by the first device to a second device; and
establish a second connection between the second device and the server device based on a destination identifier for the communication sent by the first device to the second device; and
at least one processor configured to share, by the first connection and the second connection, at least a first call-enhancing element with the first device and at least a second call-enhancing element with the second device, each call-enhancing element being associated with at least one of the source identifier and the destination identifier, wherein:
the first call-enhancing element comprises first content data including at least one of first audio content, first visual content, and first interactive content, and
the second call-enhancing element comprises second content data different from the first content data, the second content data including at least one of second audio content, second video content, and second interactive content;
wherein the at least one processor is configured to share the at least one call-enhancing element at the same time as communication data between the first device and the second device by a separate connection from the at least one connection by which the first call-enhancing element and the second call-enhancing element are shared.

26. The server device of claim 25, wherein the communication is a phone call.

27. The server device of claim 25, wherein the communication is a text message.

28. The server device of claim 25, wherein at least one of the source identifier and the destination identifier is detected from data or metadata associated with the communication on at least one of the first device and the second device.

29. The server device of claim 25, wherein the at least one call-enhancing element comprises a graphic, an animation, a sound, a video, an interface, an interactive element, or a combination thereof.

30. The server device of claim 25, wherein:
the networking element is further configured to establish at least one additional connection between at least one additional device and the server device; and
the at least one processor is further configured to share, the at least one additional connection, the call-enhancing element with the at least one additional device.

* * * * *

UNITED STATES PATENT AND TRADEMARK OFFICE
CERTIFICATE OF CORRECTION

PATENT NO. : 10,356,234 B2  
APPLICATION NO. : 15/692687  
DATED : July 16, 2019  
INVENTOR(S) : Benjamin J. Whitehorn It is certified that error appears in the above-identified patent and that said Letters Patent is hereby corrected as shown below:

In the Claims

Column 17, Line 2, delete "video," and insert --visual--.

Column 18, Line 11, delete "detecting" and insert --detect,--.

Column 18, Line 14, delete "sharing" and insert --share--.

Column 18, Line 18, delete "a" and insert --the--.

Column 18, Line 32, delete "video," and insert --visual--.

Column 20, Line 7, delete "video," and insert --visual--.

Signed and Sealed this  
Twenty-third Day of December, 2025

John A. Squires  
*Director of the United States Patent and Trademark Office*